United States Patent
Pyen et al.

(10) Patent No.: US 11,115,093 B2
(45) Date of Patent: Sep. 7, 2021

(54) ELECTRONIC DEVICE SUPPORTING THERMAL MITIGATING AND A CONTROL METHOD OF THEREOF

(71) Applicant: LG ELECTRONICS INC., Seoul (KR)

(72) Inventors: Seungman Pyen, Seoul (KR); Jaehyeong Son, Seoul (KR); Eunsoo Na, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/935,379

(22) Filed: Jul. 22, 2020

(65) Prior Publication Data

US 2021/0250070 A1    Aug. 12, 2021

(30) Foreign Application Priority Data

Feb. 7, 2020 (KR) ........................ 10-2020-0015223

(51) Int. Cl.
*H04B 7/06* (2006.01)
*G01K 3/14* (2006.01)
(Continued)

(52) U.S. Cl.
CPC ............... *H04B 7/061* (2013.01); *G01K 3/14* (2013.01); *H04B 7/0602* (2013.01);
(Continued)

(58) Field of Classification Search
CPC ...... H04B 7/02; H04B 7/0404; H04B 7/0413; H04B 7/0452; H04B 7/0602;
(Continued)

(56) References Cited

U.S. PATENT DOCUMENTS

| 2013/0288610 A1* | 10/2013 | Toh | ........................ H03F 3/24 455/67.14 |
| 2014/0199952 A1* | 7/2014 | Sandhu | ..................... H04B 1/02 455/91 |

(Continued)

FOREIGN PATENT DOCUMENTS

| JP | 2020-5056 A | 1/2020 |
| KR | 10-2015-0106911 A | 9/2015 |
| KR | 10-2016-0100150 A | 8/2016 |

*Primary Examiner* — Young T. Tse
(74) *Attorney, Agent, or Firm* — Birch, Stewart, Kolasch & Birch, LLP

(57) ABSTRACT

An electronic device including a plurality of antenna modules configured to wireless communicate with a base station according to a first communication scheme; a plurality of temperature sensors respectively provided in the plurality of antenna modules and configured to detect a temperature of each antenna module; and a modem configured to detect a temperature difference between a highest temperature antenna module and a lowest temperature antenna module among the plurality of antenna modules, and switch from using a first antenna module performing wireless communication with the base station to a second antenna module among the plurality of antenna modules to perform the wireless communication with the base station based on the detected temperature difference being above a preset temperature difference.

20 Claims, 22 Drawing Sheets

(51) Int. Cl.
*H04B 7/08* (2006.01)
*H04B 7/0404* (2017.01)
*H01Q 1/24* (2006.01)
*G01K 13/00* (2021.01)

(52) U.S. Cl.
CPC ........... *H04B 7/0604* (2013.01); *H04B 7/082* (2013.01); *H04B 7/0817* (2013.01); *H04B 7/0825* (2013.01); *G01K 13/00* (2013.01); *H01Q 1/243* (2013.01); *H04B 7/0404* (2013.01)

(58) Field of Classification Search
CPC .... H04B 7/0606; H04B 7/061; H04B 7/0693; H04B 7/0802; H04B 7/0817; H04B 7/082; H04B 7/0825; H04B 7/2606; H01Q 11/243; G01K 3/005; G01K 3/06; G01K 3/08; G01K 3/14; G01K 13/00; G01K 13/10
USPC ........ 375/219, 220, 222, 260, 267; 370/328, 370/334; 455/500, 517, 524, 88
See application file for complete search history.

(56) References Cited

U.S. PATENT DOCUMENTS

| | | |
|---|---|---|
| 2015/0349836 A1 | 12/2015 | Ponukumati et al. |
| 2018/0278309 A1 | 9/2018 | Raghavan et al. |
| 2019/0123787 A1* | 4/2019 | Seol ................ H04B 7/0602 |
| 2019/0392694 A1* | 12/2019 | Funaki ............ H04B 7/0874 |
| 2021/0091448 A1* | 3/2021 | Kang ................ H01Q 1/002 |

\* cited by examiner

FIG. 7B

| SUBCARRIER SPACING: $f_o \times 2^\mu$, $f_o = 15kMz$ AND SCALING VALUE $2^\mu, \in \{-2, 0, 1, 2,..., 5\}$ | | | | | | | |
|---|---|---|---|---|---|---|---|
| $\mu$ | -2 | 0 | 1 | 2 | 3 | 4 | 5 |
| SUBCARRIER SPACING [kHz] | 3.75 | 15 | 30 | 60 | 120 | 240 | 480 |
| LENGTH OF OFDM SYMBOL [$\mu s$] | 266.67 | 66.67 | 33.33 | 16.67 | 8.333 | 4.17 | 2.08 |

15kHz 1 SLOT(14 SYMBOLS) : 1ms SUBFRAME

| 0 | 1 | 2 | 3 | 4 | 5 | 6 | 7 | 8 | 9 | 10 | 11 | 12 | 13 |

| 0 | 1 | 2 | 3 | 4 | 5 | 6 | 7 | 8 | 9 | 10 | 11 | 12 | 13 |  30kHz 1 SLOT(14 SYMBOLS) : 0.5ms

| 0 | 1 |  15kHz 1 SLOT(2 SYMBOLS) : 0.2ms

| 0 | 1 | 2 | 3 |  30kHz MINI SLOT(4 SYMBOLS) : 0.2ms

| 0 | 1 | 2 | 3 | 4 | 5 | 6 |  60kHz MINI SLOT(7 SYMBOLS) : 0.125ms

ELECTRONIC DEVICE SUPPORTING THERMAL MITIGATING AND A CONTROL METHOD OF THEREOF

CROSS-REFERENCE TO RELATED APPLICATION

Pursuant to 35 U.S.C. § 119(a), this application claims the benefit of an earlier filing date of and the right of priority to Korean Patent Application No. 10-2020-0015223 filed on Feb. 7, 2020, the contents of which are incorporated by reference herein in its entirety.

BACKGROUND OF THE INVENTION

1. Field of the Invention

The present disclosure relates to an electronic device supporting 5G communication, and more particularly, to an electronic device capable of effectively mitigating heat generated from the electronic device as well as more effectively performing 5G communication, and a control method of the same.

2. Discussion of the Related Art

In recent years, various electronic devices including mobile terminals have been commercialized in wireless communication systems using LTE communication technology to provide a variety of services. Also, it is expected that in the future, wireless communication systems using 5G communication technology will be commercialized to provide a variety of services. Meanwhile, some of LTE frequency bands may be allocated to provide 5G communication services.

As ultra-high-speed wireless data communication is supported as described above, an electronic device may include a plurality of antenna modules, and high-speed wireless data communication may be carried out by applying a higher voltage to the plurality of antenna modules. In particular, in the case of millimeter wave (mmWave) communication using ultra-high frequencies of 30-300 GHz, it has an advantage of having a very high data transfer rate using a high bandwidth, but there is a problem that can cause a sudden temperature rise around a power amplifier (PA) since a voltage applied to the PA is high.

Accordingly, studies for mitigating a sudden temperature rise that may occur during millimeter wave (mmWave) communication has been actively carried out in recent years. As part of the studies, a thermal mitigation scheme of reducing the number of antennas forming beams for mmWave communication whenever the temperature of the antenna modules reaches a predetermined temperature so as to mitigate heat, switching to another mmWave module when the heat continues, and performing wireless communication in a different manner from the mmWave communication scheme when the heat still continues is contrived.

For this thermal mitigation scheme, a specific thermal mitigation operation corresponding to a specific temperature is specified in advance. For example, when the antenna module reaches a first temperature in a normal operation state, a thermal mitigation operation according to the first temperature is performed, and when the antenna temperature reaches a second temperature, the thermal mitigation operation according to the second temperature is performed.

For the thermal mitigation scheme, specific thermal mitigation operations (LV0-LV3) corresponding to specific temperatures are specified, and corresponding thermal mitigation operations (LV0-LV3) are sequentially carried out as the temperature of the antenna module increases. For example, it follows a fixed sequence of initially reducing the number of antennas in a first antenna module when the temperature of the first antenna module that transmits and receives a wireless signal to and from a base station increases above a predetermined level (first phase thermal mitigation), and transitioning from a first antenna module to a second antenna module when a temperature detected while reducing the number of antennas is above a temperature (second temperature) corresponding to a second phase thermal mitigation condition. Furthermore, when the temperature of the second antenna module reaches a preset communication scheme switching temperature while transitioning to the second antenna module, the communication scheme is switched to 4G mode to mitigate heat in the first antenna module and the second antenna module. Accordingly, even though an actual surface temperature of an electronic device, that is, a temperature of an AP (Application Processor) or a temperature of a circuit mounted with the AP, modem and antenna modules, does not reach the communication mode switching temperature, the switching of the communication scheme is carried out due to the temperature of the antenna module, thereby reducing the connection time of 5G communication.

Moreover, for millimeter wave (mmWave) communication during 5G communication, a higher frequency band than a NR (New Radio) scheme is used to generate more heat, thereby further reducing a communication time using mmWaves for a 5G electronic device capable of performing millimeter wave (mmWave) communication.

SUMMARY OF THE INVENTION

An aspect of the present disclosure is to solve the above-mentioned problems and other problems, and to provide an electronic device and a control method thereof capable of performing suitable thermal mitigation according to an actual surface temperature of an electronic device, thereby further extending the connection time of 5G communication.

Furthermore, an aspect of the present disclosure is to provide an electronic device and a control method thereof capable of reflecting a temperature difference between antenna modules so as to switch to a lower temperature antenna module, thereby more effectively performing thermal mitigation than a thermal mitigation process being carried out in a preset order.

In order to achieve the foregoing and other objectives of the present disclosure, an electronic device according to an embodiment of the present disclosure may include a plurality of antenna modules capable of wireless communication with a base station according to a first communication scheme, a plurality of temperature sensors provided in the plurality of antenna modules, respectively, to detect a temperature of each antenna module, and a modem configured to detect a temperature difference between an antenna module having a highest temperature and an antenna module having a lowest temperature among the plurality of antenna modules, and switch a first antenna module performing wireless communication with the base station based on whether the detected temperature difference is above a preset temperature difference to any one of the remaining antenna modules except for the antenna module having the highest temperature among the plurality of antenna modules, and perform wireless communication with the base station through the switched antenna module.

According to an embodiment, the modem may detect an electric field state of a signal according to the first communication scheme prior to detecting the temperature difference, and deactivate at least one antenna module in the plurality of antenna modules when the electric field state is above a preset level as a result of the detected electric field state.

According to an embodiment, the modem may determine whether the electric field state of the signal according to the first communication scheme is better above the preset level based on reference signal received power (RSRP) or a bit error rate (BER) detected from the signal according to the first communication scheme.

According to an embodiment, the preset temperature difference may vary depending on a surface temperature of the electronic device.

According to an embodiment of the present disclosure, the preset temperature difference may be set to decrease as the surface temperature of the electronic device increases.

According to an embodiment, the surface temperature of the electronic device may be determined according to the temperature of an application processor (AP) of the electronic device or the temperature of a circuit board disposed with the AP.

According to an embodiment, the heat dissipation characteristics of the plurality of antenna modules may vary depending on at least one of a placement position of each antenna module, characteristics of a heat dissipation member connected to each antenna module, a structure of each antenna module connected to the heat dissipation member, a material of another member adjacent to each antenna module, and a shape of an inner space in which each antenna module is disposed.

According to an embodiment, the modem may switch the first antenna module to an antenna module having a lowest temperature among the plurality of antenna modules.

According to an embodiment, the modem may switch the antenna module to any one of the remaining antenna modules except for an antenna module having a highest temperature, and at least one antenna module that satisfies a preset condition, among the plurality of antenna modules, and the preset condition may be determined according to a temperature difference between a preset temperature and an antenna module having a lowest temperature.

According to an embodiment, when switched to any one of the remaining antenna modules, the antenna module having the highest temperature and the at least one antenna module that satisfies the preset condition may be deactivated together.

According to an embodiment, the electronic device may further include an antenna module transmitting and receiving a signal according to a second communication scheme different from the first communication scheme, wherein the modem further determines a surface temperature of the electronic device, and changes the communication scheme to the second communication scheme, and performs wireless communication through the antenna module according to the second communication scheme when all temperatures detected from the plurality of antenna modules or the determined surface temperature of the electronic device are above a preset communication scheme switching temperature.

According to an embodiment, the first communication scheme may be a 5G communication scheme using a millimeter wave (mmWave) frequency band, and the second communication scheme may be either one of a 5G communication scheme using a sub-6 frequency band and a 4G communication scheme.

According to an embodiment, when the communication scheme is changed to the second communication scheme, the modem may change the communication scheme back to the first communication scheme based on whether all temperatures detected from the plurality of antenna modules or the determined surface temperature of the electronic device are below a preset communication scheme allowable temperature.

According to an embodiment, the modem may detect a temperature difference between an antenna module having a highest temperature and a temperature of an antenna module having a lowest temperature among the plurality of antenna modules according to a preset period, and perform antenna module switching according to the detection result.

According to an embodiment, when the preset period expires, the modem may detect whether there is an antenna module that has been switched to an inactive state by antenna module switching among the plurality of antenna modules, and change the preset period according to the detection result.

In order to achieve the foregoing and other objectives, there is provided a method of controlling an electronic device, and the method may include performing wireless communication according to a first communication scheme through any one of a plurality of antenna modules provided in the electronic device, detecting an antenna module exceeding a preset first temperature among the plurality of antenna modules, detecting a temperature difference between an antenna module having a highest temperature and an antenna module having a lowest temperature among the plurality of antenna modules when the antenna module exceeding the first temperature is not detected, determining a threshold temperature difference according to a surface temperature of the electronic device, and switching an antenna module performing wireless communication with a base station to any one of the remaining antenna modules except for the antenna module having the highest temperature among the plurality of antenna modules according to a result of comparing a temperature difference between the antenna modules and the threshold temperature difference.

According to an embodiment, said performing wireless communication according to a first communication scheme may include detecting an electric field state between the base station and the electronic device, and deactivating at least one of the antennas of each of the plurality of antenna modules based on the detected electric field state.

According to an embodiment, said switching the antenna module may include detecting an antenna module exceeding a preset second temperature among the plurality of antenna modules except for the antenna module having the highest temperature, detecting a second temperature difference between the antenna module exceeding the second temperature and the antenna module having the lowest temperature when there is the antenna module exceeding the second temperature, detecting whether the second temperature difference is above the threshold temperature difference, and switching the antenna module to any one of the remaining antenna modules except for the antenna module having the highest temperature and the antenna module exceeding the second temperature depending on whether the second temperature difference is above the threshold temperature difference.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIGS. 7A and 7B are conceptual views illustrating a structure of a frame according to a 5G communication scheme (NR: New Radio).

DETAILED DESCRIPTION OF THE EMBODIMENTS

Figure 1A:
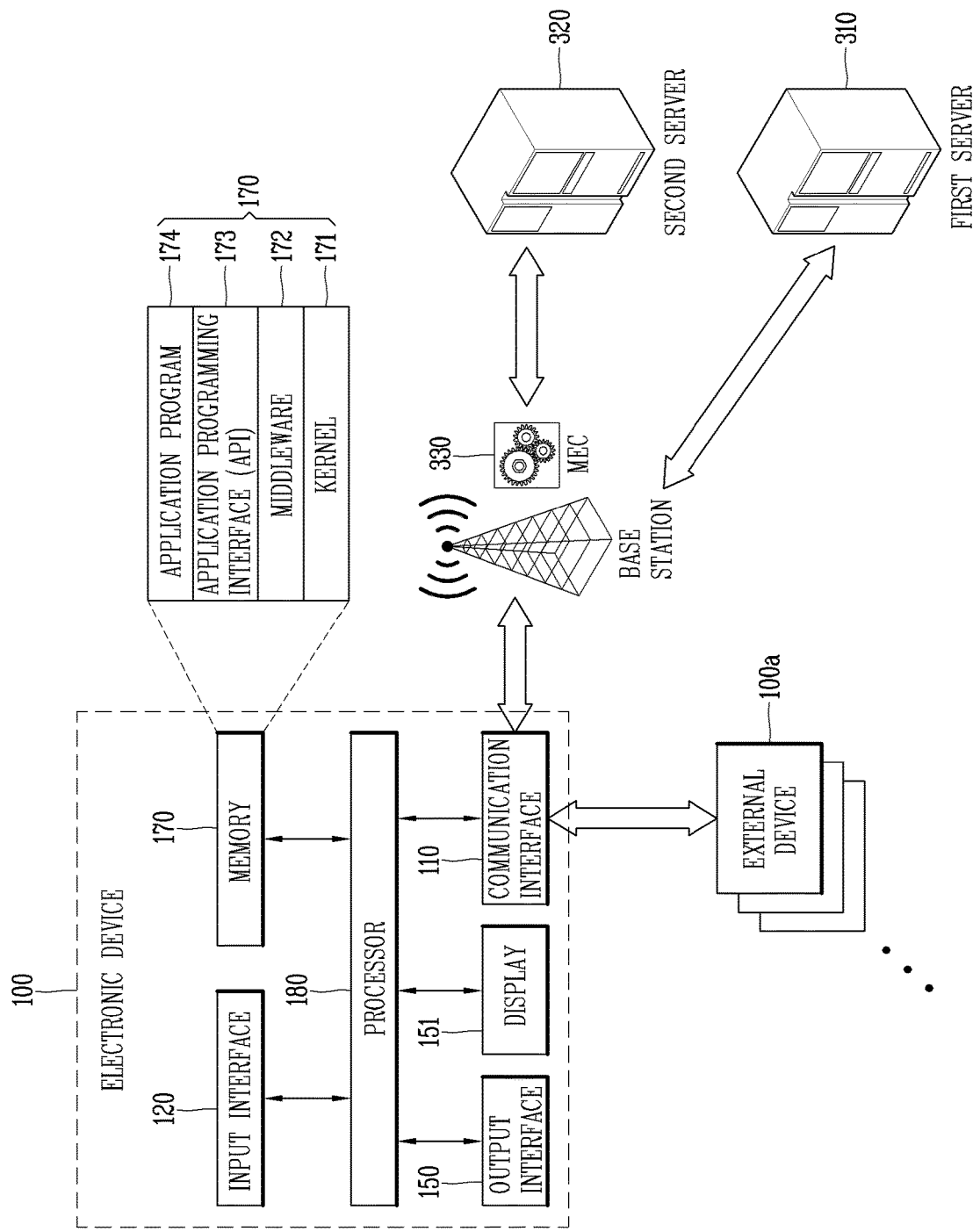
FIGS. 1A and 1B are conceptual views showing an interface between an electronic device and an external device or a server associated with an embodiment of the present disclosure.

Hereinafter, preferred embodiments of the present disclosure will be described in detail with reference to the accompanying drawings, and the same or similar elements are designated with the same numeral references regardless of the numerals in the drawings and their redundant description will be omitted. A suffix "module" and "unit" used for constituent elements disclosed in the following description is merely intended for easy description of the specification, and the suffix itself does not give any special meaning or function. The accompanying drawings are used to help easily understand the technical idea of the present disclosure and it should be understood that the idea of the present disclosure is not limited by the accompanying drawings.

It will be understood that although the terms first, second. etc. may be used herein to describe various elements, these elements should not be limited by these terms. These terms are generally only used to distinguish one element from another. It will be understood that when an element is referred to as being "connected with" another element, the element can be directly connected with the other element or intervening elements may also be present. On the contrary, in case where an element is "directly connected" or "directly linked" to another element, it should be understood that any other element is not existed therebetween.

A singular representation may include a plural representation as far as it represents a definitely different meaning from the context. Terms "include" or "have" used herein should be understood that they are intended to indicate the existence of a feature, a number, a step, a constituent element, a component or a combination thereof disclosed in the specification, and it may also be understood that the existence or additional possibility of one or more other features, numbers, steps, constituent elements, components or combinations thereof are not excluded in advance.

Electronic devices described herein may include cellular phones, smart phones, laptop computers, digital broadcasting terminals, personal digital assistants (PDAs), portable multimedia players (PMPs), navigators, slate PCs, tablet PCs, ultrabooks, wearable devices (for example, smart watches, smart glasses, head mounted displays (HMDs)), and the like. However, it may be easily understood by those skilled in the art that the configuration according to the exemplary embodiments of this specification can also be applied to stationary terminals such as digital TV, desktop computers, digital signages, and the like, excluding a case of being applicable only to the mobile terminals.

Figure 1B:
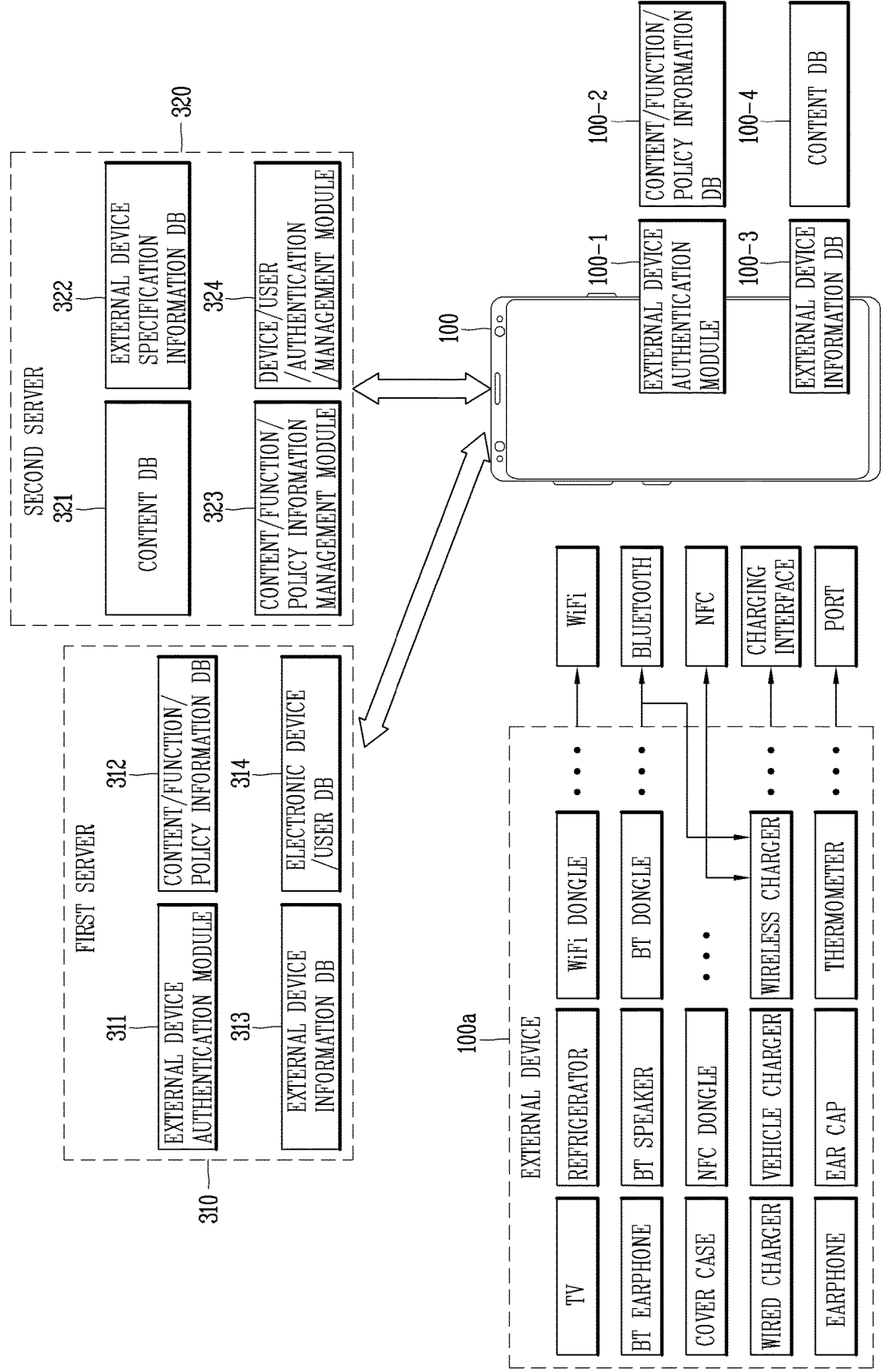

Referring to FIGS. 1A and 1B, FIG. 1A illustrates an interface between an electronic device and an external device or a server illustrating an electronic device according to an embodiment. FIG. 1B illustrates a detailed configuration in which an electronic device interfaces with an external device or a server according to an embodiment. In addition, FIG. 2A illustrates a detailed configuration of the electronic device of FIG. 1A, and FIGS. 2B and 2C are conceptual views showing an example of an electronic device according to the present disclosure is seen from different directions.

Referring to FIG. 1A, the electronic device 100 includes a communication interface 110, an input interface (or input device) 120, an output interface (or output device) 150, and a processor 180. Here, the communication interface 110 may refer to a wireless communication module 110. Furthermore, the electronic device 100 may further include a display 151 and a memory 170. FIG. 1A illustrates the electronic device 100 having various components, but it may be understood that implementing all of the illustrated components is not a requirement. Greater or fewer components may alternatively be implemented.

In more detail, the wireless communication module 110 of those components may typically include one or more modules which permit wireless communications between the electronic device 100 and a wireless communication system, between the electronic device 100 and another electronic device 100, or between the electronic device 100 and an external server. In addition, the wireless communication module 110 may include one or more modules for connecting the electronic device 100 to one or more networks. Here, the one or more networks may be a 4G communication network and a 5G communication network, for example.

Figure 2A:
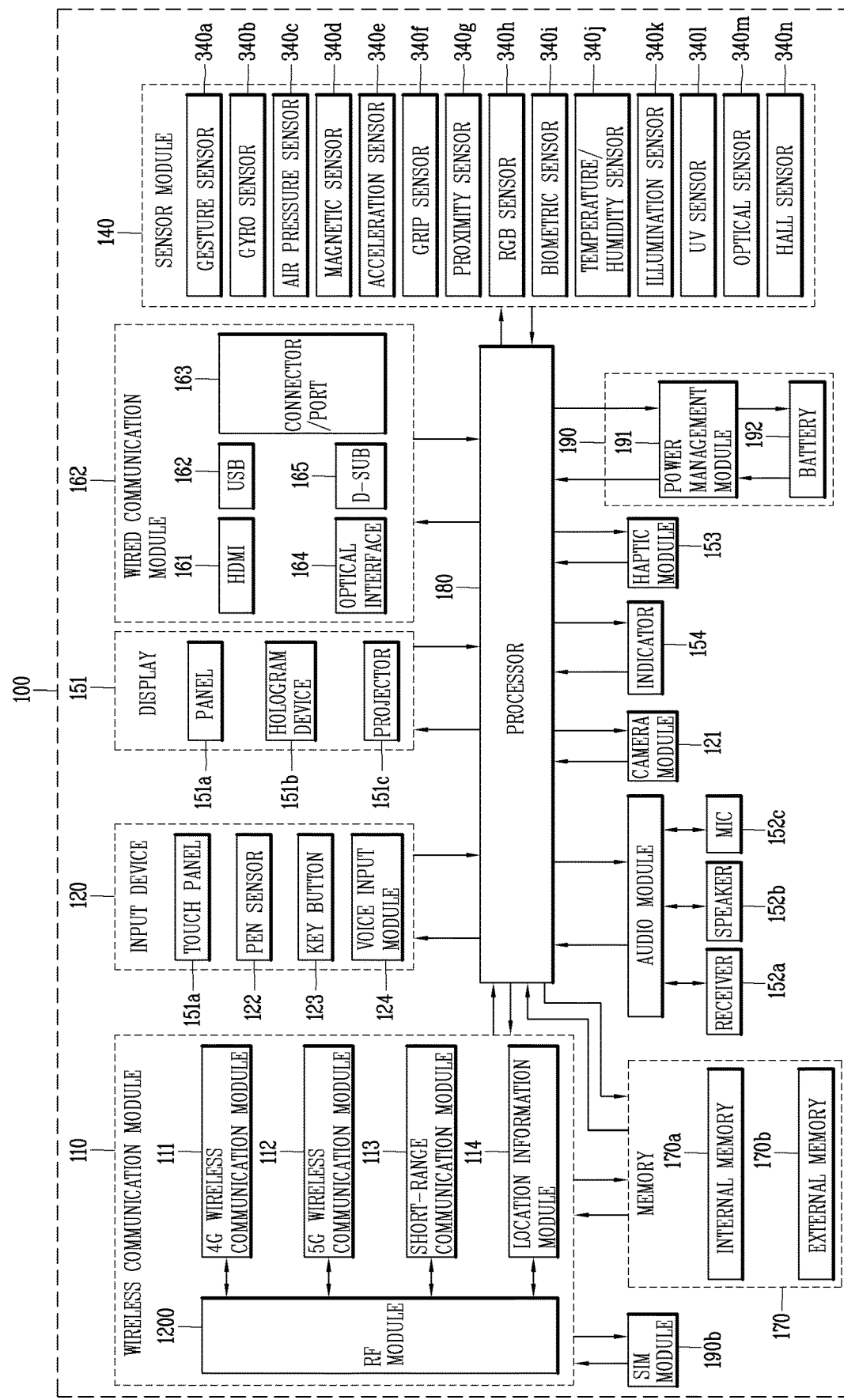
FIG. 2A is a block diagram illustrating a detailed configuration of an electronic device associated with an embodiment of the present disclosure.
Figure 2B:
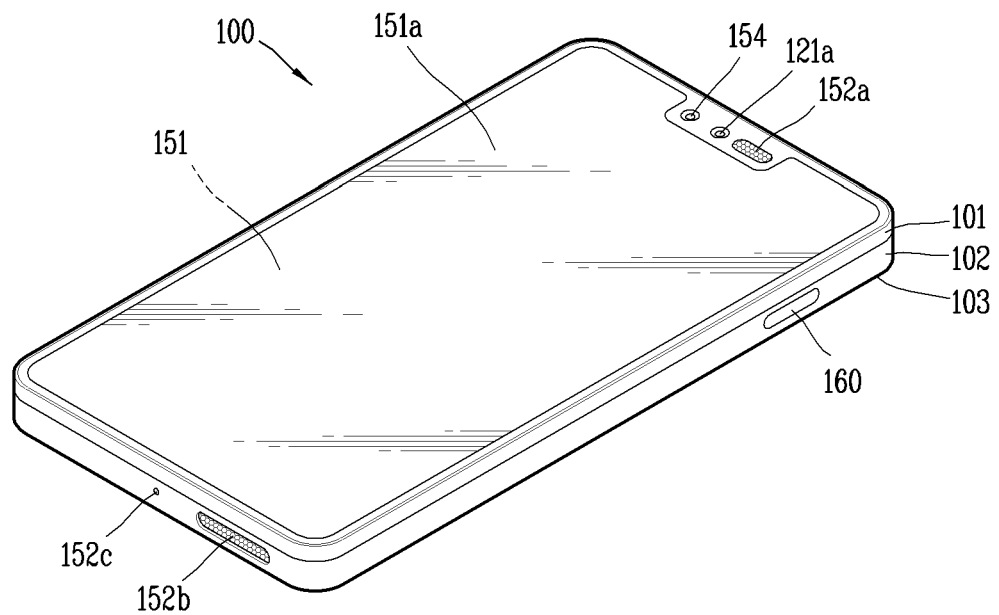
FIGS. 2B and 2C are perspective views in which an electronic device associated with an embodiment of the present disclosure is seen from different directions.
Figure 2C:
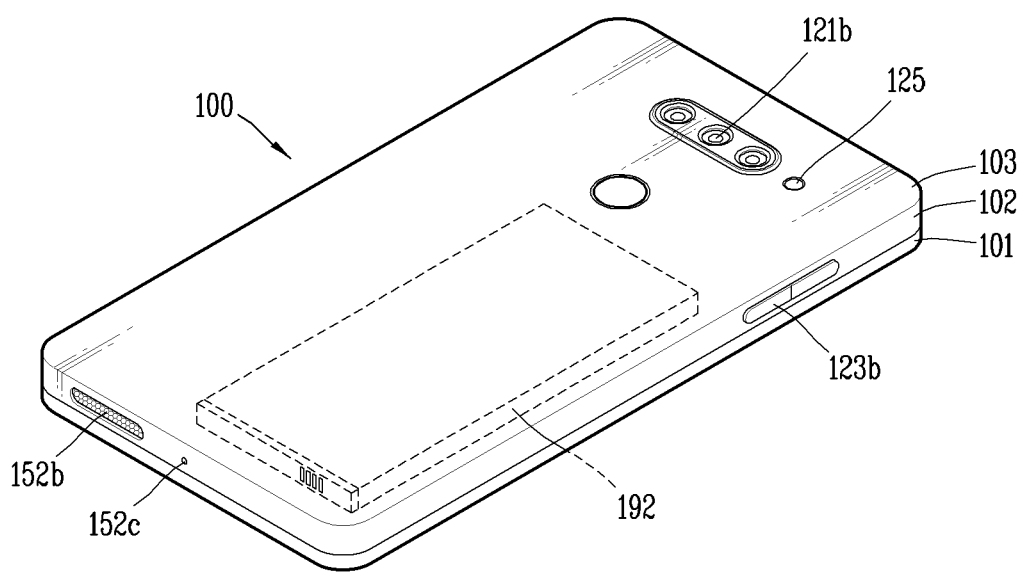

Referring to FIGS. 1A and 2A, the wireless communication module 110 may include at least one of a 4G wireless communication module 111, a 5G wireless communication module 112, a short-range communication module 113, and a location information module 114. In this regard, the 4G wireless communication module 111, the 5G wireless communication module 112, the short-range communication module 113, and the location information module 114 may be implemented as a baseband processor such as a modem. For an example, the 4G wireless communication module 111, the 5G wireless communication module 112, the short-range communication module 113, and the location information module 114 may be implemented with a transceiver circuit and a baseband processor operating in an IF band. In addition, the RF module 1200 may be implemented as an RF transceiver circuit operating in an RF frequency band of each communication system. However, the present disclosure is not limited thereto, and the 4G wireless communication module 111, the 5G wireless communication module 112, the short-range communication module 113, and the location information module 114 may be interpreted to include respective RF modules.

The 4G wireless communication module 111 may transmit and receive 4G signals to and from a 4G base station through a 4G mobile communication network. In this instance, the 4G wireless communication module 111 may transmit one or more 4G transmission signals to the 4G base station. Furthermore, the 4G wireless communication module 111 may receive one or more 4G reception signals from the 4G base station. In this regard, up-link (UL) multi-input multi-output (MIMO) may be performed by a plurality of 4G transmission signals transmitted to the 4G base station. In addition, down-link (DL) multi-input multi-output (MIMO) may be performed by a plurality of 4G reception signals received from the 4G base station.

The 5G wireless communication module 112 may transmit and receive 5G signals to and from a 5G base station through a 5G mobile communication network. Here, the 4G base station and the 5G base station may have a non-stand alone (NSA) structure. For instance, the 4G base station and the 5G base station may have a co-located structure deployed at the same location in a cell. Alternatively, the 5G base station may be deployed with a stand-alone (SA) structure at a location separate from the 4G base station.

The 5G wireless communication module 112 may transmit and receive 5G signals to and from a 5G base station through a 5G mobile communication network. In this instance, the 5G wireless communication module 112 may transmit one or more 5G transmission signals to the 50 base station. Furthermore, the 50 wireless communication module 112 may receive one or more 5G reception signals from the 5G base station.

In this instance, the 5G frequency band may use the same band as the 4G frequency band, which may be referred to as LTE re-farming. Meanwhile, as the 5G frequency band, a sub-6 band, which is a band of 6 GHz or less, may be used.

In addition, a millimeter wave (mmWave) band may be used as the 5G frequency band to perform broadband high-speed communication. When a millimeter wave (mmWave) band is used, the electronic device 100 may perform beam forming for communication coverage expansion with the base station.

In addition, regardless of the 5G frequency band, a 5G communication system may support a larger number of multi-input multi-output (MIMO) to improve the transmission speed. In this regard, up-link (UL) MIMO may be performed by a plurality of 5G transmission signals transmitted to a 5G base station. In addition, down-link (DL) MIMO may be performed by a plurality of 5G reception signals received from a 5G base station.

Meanwhile, the wireless communication module 110 may be in a dual connectivity (DC) state with a 4G base station and a 5G base station through the 4G wireless communication module 111 and the 5G wireless communication module 112. As such, dual connectivity with the 4G base station and the 5G base station may be referred to as EN-DC (EUTRAN NR DC). Here, EUTRAN denotes a 4G wireless communication system as an Evolved Universal Telecommunication Radio Access Network, and NR denotes a 5G wireless communication system as New Radio.

In addition, when the 4G base station and 5G base station have a co-located structure, it may be possible to improve throughput through inter-carrier aggregation (CA). Accordingly, when in an EN-DC state with the 4G base station and the 5G base station, 4G reception signals and 5G reception signals may be simultaneously received through the 4G wireless communication module 111 and the 5G wireless communication module 112.

The short-range communication module 113 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the electronic device 100 and a wireless communication system, between the electronic device 100 and another electronic device 100, or between the electronic device and a network where another electronic device 100 (or an external server) is located, via wireless personal area networks. The short-range communication module 114 denotes a module for short-range communications.

Meanwhile, short-range communication between electronic devices may be performed using the 4G wireless communication module 111 and the 5G wireless communication module 112. In one embodiment, short-range communication may be performed by a device-to-device (D2D) scheme between electronic devices without passing through a base station.

Meanwhile, carrier aggregation (CA) may be performed using at least one of the 4G wireless communication module 111 and the 5G wireless communication module 112 and the Wi-Fi communication module 113 transmission speed enhancement and communication system convergence. In this regard, 4G+WiFi carrier aggregation (CA) may be performed using the 4G wireless communication module 111 and the Wi-Fi communication module 113. Alternatively, 5G+WiFi carrier aggregation (CA) may be performed using the 5G wireless communication module 112 and the Wi-Fi communication module 113.

The location information module 114 is a module for acquiring the location (current location) of the electronic device, and there is a Global Positioning Module (GPS) module or Wireless Fidelity (WiFi) as a representative example. For example, when the electronic device uses the GPS module, the location of the electronic device may be acquired using a signal sent from a GPS satellite. As another example, when the electronic device uses the Wi-Fi module, the location of the electronic device may be acquired based on the information of a wireless access point (AP) which transmits or receives wireless signals to or from the Wi-Fi module. As the need arises, the location information module 114 may alternatively or additionally function with any of the other modules of the wireless communication unit 110 to obtain data related to the location of the electronic device. As a module used to acquire the location (or current location) of the electronic device, the location information module 114 may not be necessarily limited to a module for directly calculating or acquiring the location of the electronic device.

Specifically, when the electronic device uses the 5G wireless communication module 112, the location of the electronic device may be acquired based on the information of the 5G base station transmitting or receiving wireless signals to or from the 5G wireless communication module. In particular, since the 5G base station with a millimeter wave (mmWave) band is deployed in a small cell having a narrow coverage, it is advantageous to obtain the location of the electronic device.

The input device 120 may include a pen sensor 1200, a key button 123, a voice input module 124, a touch panel 151*a*, and the like. In addition, the input device 120 may include a camera module 121 for inputting an image signal, a microphone 152*c* or an audio input module for inputting an audio signal, or a user input unit 123 (e.g., a touch key, a push key (or a mechanical key), etc.) for allowing a user to input information. Audio data or image data collected by the input device 120 may be analyzed and processed by a user's control command.

The camera module 121 is a device capable of capturing still images and moving images. According to one embodiment, the camera module 121 may include one or more image sensors (e.g., a front sensor or a rear sensor), a lens, an image signal processor (ISP), or a flash (e.g., LED or lamp).

The sensing module 140 may include one or more sensors for sensing at least one of information within the electronic device, surrounding environment information of the electronic device, and user information. For example, the sensor module 140 may include at least one of a gesture sensor 340*a*, a gyro sensor 340*b*, an air pressure sensor 340*c*, a magnetic sensor 340*d*, an acceleration sensor 340*e*, a grip sensor 340*f*, and a proximity sensor 340*g*, a color sensor 340*h* (e.g., red (green, blue) sensor), a biometric sensor 340*i*, a temperature/humidity sensor 340*j*, an illumination sensor 340*k* or an ultra violet (UV) sensor 3401, an optical sensor 340*m*, and a hall sensor 340*n*. In addition, the sensor module 140 may include at least one of a finger scan sensor, an ultrasonic sensor, an optical sensor (e.g., refer to the camera 121), a microphone (refer to the microphone 152*c*), a battery gauge, an environment sensor (e.g. a barometer, a hygrometer, a thermometer, a radiation sensor, a heat sensor, a gas sensor, etc.), and a chemical sensor (e.g. an electronic noses, a healthcare sensor, a biometric sensor, etc.). In addition, the electronic device disclosed herein may use information in such a manner of combining information sensed by at least two sensors of those sensors.

The output unit 150 may include at least one of a display 151, an audio module 152, a haptic module 153, and an indicator 154 to generate an output associated with visual, auditory and tactile senses. In this regard, the display 151 may have an inter-layered structure or an integrated structure with a touch sensor, thereby facilitating a touch screen. The touch screen may provide an output interface between the electronic device 100 and a user, as well as functioning as the user input unit 123 which provides an input interface between the electronic device 100 and the user. For example, the display 151 may include a liquid crystal display (LCD), a light emitting diode (LED) display, an organic light emitting diode (OLED) display, or a micro electro mechanical systems (MEMS) display, or an electronic paper display. For example, the display 151 may display various contents (e.g., text, images, videos, icons, and/or symbols, etc.) to the user. The display 151 may include a touch screen, and for example, the display 151 may receive a touch, a gesture, a proximity, or a hovering input using an electronic pen or part of the user's body.

Further, the display 151 may include a touch panel 151*a*, a hologram device 151*b*, a projector 151*c*, and/or a control circuit for controlling them. In this regard, the panel may be implemented to be flexible, transparent, or wearable. The panel may be configured with the touch panel 151*a* and one or more modules. The hologram device 151*b* may show a stereoscopic image in the air by using interference of light. The projector 151*c* may project light onto a screen to display an image. For example, the screen may be located inside or outside the electronic device 100.

The audio module 152 may be configured to interoperate with the receiver 152*a*, the speaker 152*b*, and the microphone 152*c*. Meanwhile, the haptic module 153 may convert an electrical signal into a mechanical vibration, and generate a vibration or a haptic effect (e.g., pressure, texture). The electronic device may include, for example, a mobile TV supporting apparatus (e.g., GPU) capable of processing media data according to a standard such as digital multimedia broadcasting (DMB), digital video broadcasting (DVB), or mediaFlow. In addition, the indicator 154 may display a specific state of the electronic device 100 or part thereof (e.g., processor 310), for example, a booting state, a message state, a charging state or the like.

A wired communication module 160, which may be implemented as an interface unit, serves as a path to various types of external devices connected to the electronic device 100. The wired communication module 160 may include an HDMI 162, a USB 162, a connector/port 163, an optical interface 164, or a D-subminiature (D-sub) 165. Furthermore, the wired communication module 160 may include at least one of a wired/wireless headset port, an external charger port, a wired/wireless data port, a memory card port, a port for connecting a device having an identification module, an audio input/output (I/O) port, a video I/O port, and an earphone port. The electronic device 100 may execute an appropriate control related to a connected external device, in response to the external device being connected to the wired communication module 160.

In addition, the memory 170 stores data supporting various functions of the electronic device 100. The memory 170 is typically implemented to store data to support various functions or features of the electronic device 100. For instance, the memory 170 may be configured to store application programs executed in the electronic device 100, data or instructions for operations of the electronic device 100, and the like. At least some of these applications may be downloaded from an external server (e.g., a first server 310 or a second server 320) through wireless communication. Some others of those application programs may be installed within the electronic device 100 at the time of being shipped for basic functions of the electronic device 100 (e.g., receiving a call, placing a call, receiving a message, sending a message, etc.). In addition, the application programs may be stored in the memory 170, installed on the electronic device 100, and executed by the processor 180 to perform an operation (or a function) of the electronic device 100.

In this regard, the first server 310 may be referred to as an authentication server, and the second server 320 may be referred to as a content server. The first server 310 and/or the second server 320 may be interfaced with an electronic device through a base station. In addition, part of the second server 320 corresponding to the content server may be implemented as a mobile edge cloud (MEC) 330 in the base station unit. Accordingly, a distributed network may be implemented, and a content transmission delay may be shortened through the second server 320 implemented as the mobile edge cloud (MEC) 330.

The memory 170 may include a volatile and/or nonvolatile memory. In addition, the memory 170 may include an internal memory 170a and an external memory 170b. The memory 170 may store, for example, instructions or data related to at least one other component of the electronic device 100. According to one embodiment, the memory 170 may store software and/or a program 240. For example, the program 240 may include a kernel 171, middleware 172, an application programming interface (API) 173, an application program (or "application") 174, or the like. At least part of kernel 171, middleware 172, or API 174 may be referred to as an operating system (OS).

The kernel 171 may control or manage system resources (e.g., bus, memory 170, processor 180, etc.) used to execute an operation or function implemented in other programs (e.g., middleware 172, an application programming interface (API) 173, or an application program 174). In addition, the kernel 171 may access individual components of the electronic device 100 from the middleware 172, the API 173, or the application program 174 to provide an interface for controlling or managing system resources.

The middleware 172 may perform an intermediary role to allow the API 173 or the application program 174 to communicate with the kernel 171 so as to exchange data. In addition, the middleware 172 may process one or more work requests received from the application program 247 according to priority. In one embodiment, the middleware 172 prioritizes the use of system resources (e.g., bus, memory 170, or processor 180, etc.) of the electronic device 100 to at least one of the application programs 174 to process one or more work requests. The API 173 is an interface for the application program 174 to control functions provided by the kernel 171 or the middleware 1723, and may include at least one interface or function (e.g., command) for file control, window control, image processing, or text control, for instance.

The processor 180 may typically control an overall operation of the electronic device 100 in addition to the operations related to the application programs. The processor 180 may provide or process information or functions appropriate for a user by processing signals, data, information and the like, which are input or output by the foregoing components, or executing application programs stored in the memory 170. Furthermore, the processor 180 may control at least part of the components illustrated in FIGS. 1A and 2A, in order to execute the application programs stored in the memory 170. In addition, the processor 180 may combine at least two of the components included in the electronic device 100 to execute the application program.

The processor 180 may include at least one of a central processing unit (CPU), an application processor (AP), an image signal processor (ISP) or a communication processor (CP), a low power processor (e.g., a sensor hub). For example, the processor 180 may execute operations or data processing related to control and/or communication of at least one other component of the electronic device 100.

The power supply unit 190 may receive external power or internal power and supply appropriate power required for operating respective elements and components included in the electronic device 100 under the control of the processor 180. The power supply unit 190 may include a power management module 191 and a battery 192, and the battery 192 may be a built-in battery or a replaceable battery. The power management module 191 may include a power management integrated circuit (PMIC), a charger IC, or a battery or a fuel gauge. The PMIC may have a wired and/or wireless charging scheme. The wireless charging scheme may include a magnetic resonance scheme, a magnetic induction scheme, or an electromagnetic wave scheme, for example, and may further include an additional circuit for wireless charging, such as a coil loop, a resonance circuit, a rectifier, or the like. The battery gauge may measure, for example, a remaining amount of the battery 396, a voltage, a current, or a temperature during charging. For example, the battery 192 may include a rechargeable battery and/or a solar cell.

Each of the external device 100a, the first server 310, and the second server 320 may be the same or different type of device (e.g., external device or server) from the electronic device 100. According to one embodiment, all or some of operations executed by the electronic device 100 may be executed by another electronic device or a plurality of electronic devices (e.g., the external device 100a, the first server 310, and the second server 320). According to one embodiment, when the electronic device 100 is to perform a function or service automatically or by request, the electronic device 100 may request at least part of the function associated therewith to other devices (e.g., the external device 100a, the first server 310, and the second server 320) instead of or in addition to executing the function or serve by itself. The other electronic devices (e.g., the external device 100a, the first server 310, and the second server 320) may execute the requested function or additional function, and transmit the result to the electronic device 100. The electronic device 100 may process the received result as it is or additionally to provide the requested function or service. To this end, for instance, cloud computing, distributed computing, client-server computing, or mobile edge cloud (MEC) technologies may be used.

At least part of those elements and components may be combined to implement operation and control of the electronic device or a control method of the electronic device according to various exemplary embodiments described herein. Furthermore, the operation and control or the control method of the electronic device may be implemented in the electronic device by executing at least one application program stored in the memory 170.

Referring to FIGS. 1A and 1B, a wireless communication system may include an electronic device 100, at least one external device 100a, a first server 310, and a second server 320. The electronic device 100 may be functionally connected to at least one external device 100a to control the content or function of the electronic device 100 based on information received from the at least one external device 100a. According to one embodiment of the present disclosure, the electronic device 100 may perform authentication to determine whether the at least one external device 100 includes or generates information following a predetermined rule using the servers 310, 320. In addition, the electronic device 100 may control the electronic device 100 based on the authentication result to change content display or function control. According to an embodiment of the present disclosure, the electronic device 100 may be connected to at least one external device 100a through a wired or wireless communication interface to receive or transmit information. For example, the electronic device 100 and the at least one external device 100a may receive and transmit information in a manner such as near field communication (NFC), a charger (e.g., universal serial bus (USB)-C)), an ear jack, BT (Bluetooth) or WiFi (wireless fidelity).

The electronic device 100 may include at least one of an external device authentication module 100-1, a content/function/policy information DB 100-2, an external device information DB 100-3, or a content DB 104. The at least one external device 100a, as an assistant apparatus associated with the electronic device 100, may be a device designed for various purposes, such as ease of use, increased appearance aesthetics, and enhanced usability of the electronic device 100. The at least one external device 100a may or may not be in physical contact with the electronic device 100. According to one embodiment, the at least one external device 100a may be functionally connected to the electronic device 100 using a wired/wireless communication module to control information for controlling content or a function in the electronic device 100.

According to one embodiment, the at least one external device 100a may include an authentication module for encrypting/decrypting at least one of various pieces of information included in the external device information, or storing or managing it in a physical/virtual memory area that is not directly accessible from the outside. According to one embodiment, the at least one external device 100a may perform communication with the electronic device 100 or may provide information through communication between the external devices. According to one embodiment, the at least one external device 100a may be functionally connected to the server 410 or 320. In various embodiments, the at least one external device 100a may be various types of products such as a cover case, an NFC dongle, a car charger, an earphone, an ear cap (e.g., an accessory device mounted on a mobile phone audio connector), a thermometer, an electronic pen, a BT earphone, a BT speaker, a BT dongle, a TV, a refrigerator, and a WiFi dongle.

In this regard, for example, the external device 100a such as a wireless charger may supply power to the electronic device 100 through a charging interface such as a coil. In this instance, control information may be exchanged between the external device 100a and the electronic device 100 through in-band communication through a charging interface such as a coil. Meanwhile, control information may be exchanged between the external device 100a and the electronic device 100 through out-of-band communication such as Bluetooth or NFC.

In addition, the first server 310 may include a server or a cloud device for a service associated with the at least one external device 100a, or a hub device for controlling a service in a smart home environment. The first server 310 may include at least one of an external device authentication module 311, a content/function/policy information DB 312, an external device information DB 313, and an electronic device/user DB 314. The first server 310 may be referred to as an authentication management server, an authentication server, or an authentication related server. The second server 320 may include a server or cloud device for providing a service or content, or a hub device for providing a service in a smart home environment. The second server 320 may include at least one of a content DB 321, an external device specification information DB 322, a content/function/policy information management module 323, and a device/user authentication/management module 324. The second server 130 may be referred to as a content management server, a content server, or a content related server.

Referring to FIGS. 2B and 2C, the electronic device 100 disclosed herein has a bar-type terminal body. However, the present disclosure may not be necessarily limited to this, and may be also applicable to various structures such as a watch type, a clip type, a glasses type, a folder type in which two or more bodies are coupled to each other in a relatively movable manner, a slide type, a swing type, a swivel type, and the like. The description in association with a specific type of electronic device or on a specific type of electronic device will be also typically applied to another type of electronic device.

Here, the terminal body may be understood as a conception which indicates the electronic device 100 as at least one assembly.

The electronic device 100 may include a case (for example, a frame, a housing, a cover, etc.) constituting the appearance thereof. As illustrated in the drawing, the electronic device 100 may include a front case 101 and a rear case 102. Various electronic components may be incorporated into a space formed between the front case 101 and the rear case 102. At least one middle case may be additionally disposed between the front case 101 and the rear case 102

A display 151 may be disposed on a front surface of the terminal body to output information. As illustrated, a window 151a of the display 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed. Meanwhile, part of a side surface of the rear case 102 may be implemented to operate as a radiator.

As illustrated, when the rear cover 103 is coupled to the rear case 102, a side surface of the rear case 102 may be partially exposed. In some cases, upon the coupling, the rear case 102 may also be completely shielded by the rear cover 103. In addition, the rear cover 103 may include an opening for externally exposing a camera 121b or an audio output module 152b.

The electronic device 100 may include a display 151, first and second audio output modules 152a, 152b, a proximity sensor 141, an illumination sensor 152, an optical output module 154, first and second cameras 121a, 121b, first and second manipulation units 123a. 123b, a microphone 152c, a wired communication module 160, and the like.

The display 151 may display (output) information processed in the electronic device 100. For example, the display 151 may display execution screen information of an application program executed in the electronic device 100 or user interface (UI) and graphic user interface (GUI) information in response to the execution screen information.

The display 151 may be implemented in two or more in number according to a configured aspect of the electronic device 100. For instance, a plurality of the display units 151 may be arranged on one surface to be spaced apart from or integrated with each other, or may be arranged on different surfaces.

The display 151 may include a touch sensor which senses a touch onto the display so as to receive a control command in a touching manner. When a touch is input to the display 151, the touch sensor may be configured to sense this touch and the processor 180 may generate a control command corresponding to the touch. The content which is input in the touching manner may be a text or numerical value, or a menu item which can be indicated or designated in various modes.

In this manner, the display 151 may form a flexible touch screen along with the touch sensor, and In this instance, the touch screen may function as the user input unit 123 (refer to FIG. 1A). Therefore, the touch screen may replace at least some of the functions of the first manipulation unit 123a.

The first audio output module 152a may be implemented in the form of a receiver for transferring voice sounds to the user's ear or a loud speaker for outputting various alarm sounds or multimedia reproduction sounds. The optical output module 154 may output light for indicating an event generation. Examples of the event generated in the electronic device 100 may include a message reception, a call signal reception, a missed call, an alarm, a schedule notice, an email reception, information reception through an application, and the like. When a user's event check is sensed, the processor 180 may control the optical output unit 154 to end the output of light.

The first camera 121a may process video frames such as still or moving images acquired by the image sensor in a video call mode or a capture mode. The processed video frames may be displayed on the display 151 or stored in the memory 170.

The first and second manipulation units 123a, 123b are examples of the user input unit 123, which may be manipulated by a user to input a command for controlling the operation of the electronic device 100. The first and second manipulation units 123a, 123b may employ any method if it is a tactile manner allowing the user to perform manipulation with a tactile feeling such as touch, push, scroll or the like. In addition, the first and second manipulation units 123a, 123b may also employ a method of allowing the user to perform manipulation without a tactile feeling through a proximity touch, a hovering touch, or the like.

In addition, the electronic device 100 may include a fingerprint recognition sensor for recognizing a user's fingerprint, and the processor 180 may use fingerprint information sensed through the finger recognition sensor as an authentication means. The finger scan sensor may be installed in the display 151 or the user input unit 123.

The wired communication module 160 serves as a path for connecting the electronic device 100 to an external device. For example, the wired communication module 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the electronic device 100. The wired communication module 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a. The second camera 121b may include a plurality of lenses arranged along at least one line. The plurality of lenses may also be arranged in a matrix configuration. The cameras may be referred to as an "array camera." When the second camera 121b is implemented as the array camera, images may be captured in various manners using the plurality of lenses and images with better qualities may be obtained. A flash 125 may be disposed adjacent to the second camera 121b. When an image of a subject is captured with the camera 121b, the flash 125 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication. Furthermore, the microphone 152c may be configured to receive the user's voice, other sounds, and the like. The microphone 152c may be provided at a plurality of places, and configured to receive stereo sounds.

At least one antenna for wireless communication may be disposed on the terminal body. The antenna may be installed in the terminal body or formed on the case. Meanwhile, a plurality of antennas connected to the 4G wireless communication module 111 and the 5G wireless communication module 112 may be arranged on a side surface of the terminal. Alternatively, an antenna may be formed in a form of film to be attached onto an inner surface of the rear cover 103 or a case including a conductive material may serve as an antenna.

Meanwhile, the plurality of antennas arranged on a side surface of the terminal may be implemented with four or more antennas to support MIMO. In addition, when the 5G wireless communication module 112 operates in a millimeter wave (mmWave) band, as each of the plurality of antennas is implemented as an array antenna, a plurality of array antennas may be arranged in the electronic device.

A power supply unit 190 (refer to FIG. 1A) for supplying power to the electronic device 100 may be disposed on the terminal body. The power supply unit 190 may include a batter 191 which is mounted in the terminal body or detachably coupled to an outside of the terminal body.

Hereinafter, a multi-communication system structure and an electronic device including the same according to an embodiment, particularly embodiments related to an antenna and an electronic device including the same in a heterogeneous radio system, will be described with reference to the accompanying drawings. It should be understood by those skilled in the art that the present disclosure can be embodied in other specific forms without departing from the concept and essential characteristics thereof.

Meanwhile, a detailed operation and function of an electronic device having a plurality of antennas according to an embodiment provided with the 4G/5G wireless communication module as shown in FIG. 2A will be described below.

In a 5G communication system according to an embodiment, a 5G frequency band may be a higher frequency band than a sub-6 band. For example, the 5G frequency band may be a millimeter wave band, but the present disclosure is not limited thereto and may be changed according to an application.

Figure 3A:
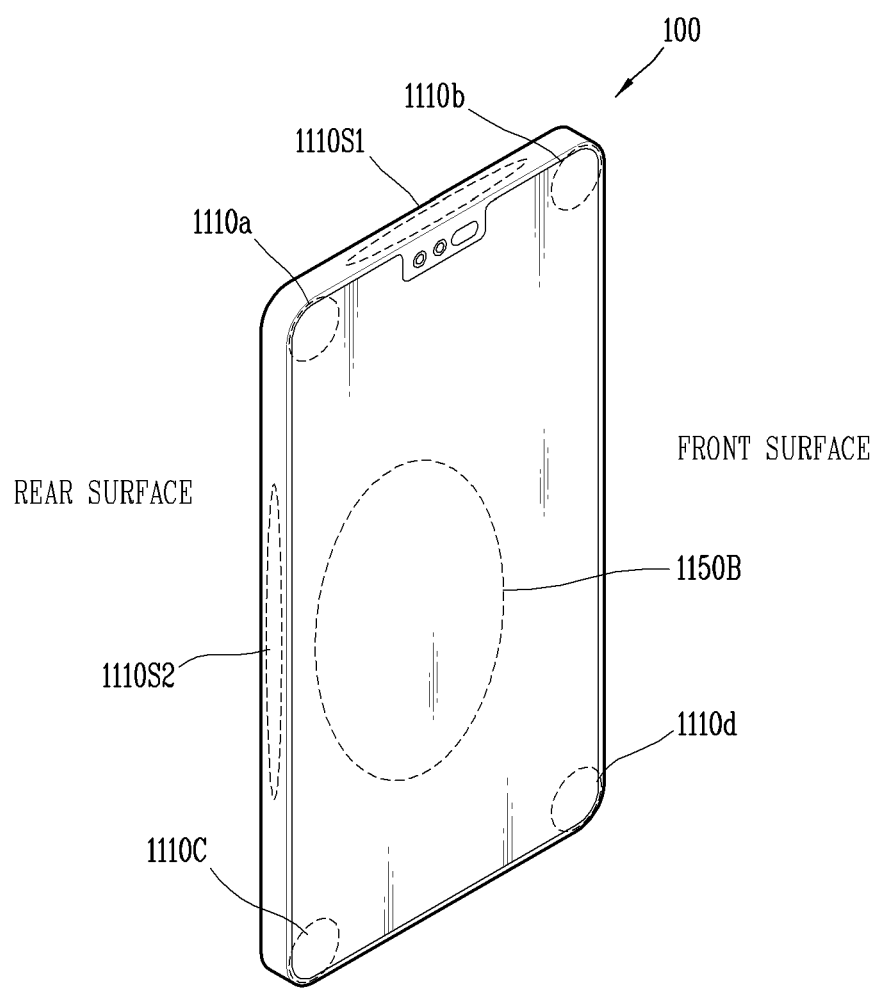
FIG. 3A is an exemplary view showing an example of a configuration in which a plurality of antennas in an electronic device associated with the present disclosure can be arranged.

FIG. 3A illustrates an example of a configuration in which a plurality of antennas in an electronic device according to an embodiment can be arranged. Referring to FIG. 3A, a plurality of antennas 1110a to 1110d may be arranged on an inner side of or a front surface of the electronic device 100. In this regard, the plurality of antennas 1110a to 1110d may be implemented in a form printed on a carrier in an electronic device or in a system-on-chip (Soc) form along with an RFIC. Meanwhile, the plurality of antennas 1110a to 1110d may be disposed on a front surface of the electronic device in addition to an inner side of the electronic device. In this regard, the plurality of antennas 1110a to 1110d disposed on a front surface of the electronic device 100 may be implemented as transparent antennas embedded in a display.

In addition, a plurality of antennas 1110S1 and 1110S2 may be disposed on a side surface of the electronic device 100. In this regard, a 4G antenna may be disposed on a side surface of the electronic device 100 in the form of a conductive member, and a slot may be disposed in a conductive member region, and the plurality of antennas 1110a to 1110d may be configured to radiate 5G signals through the slot. Furthermore, antennas 1150B may be arranged on a rear surface of the electronic device 100 to radiate 5G signals to the back.

Meanwhile, the present disclosure can transmit or receive at least one signal through the plurality of antennas 1110S1 and 1110S2 on a side surface of the electronic device 100. In addition, the present disclosure may transmit or receive at least one signal through the plurality of antennas 1110a to 1110d, 1150B, 1110S1, and 1110S2 on a front and/or side surface of the electronic device 100. The electronic device can communicate with a base station through any one of the plurality of antennas 1110a to 1110d, 1150B, 1110S1, and 1110S2. Alternatively, the electronic device can perform multi-input multi-output (MIMO) communication with the base station through two or more antennas among the plurality of antennas 1110a to 1110d, 1150B, 1110S1, and 1110S2.

Figure 3B:
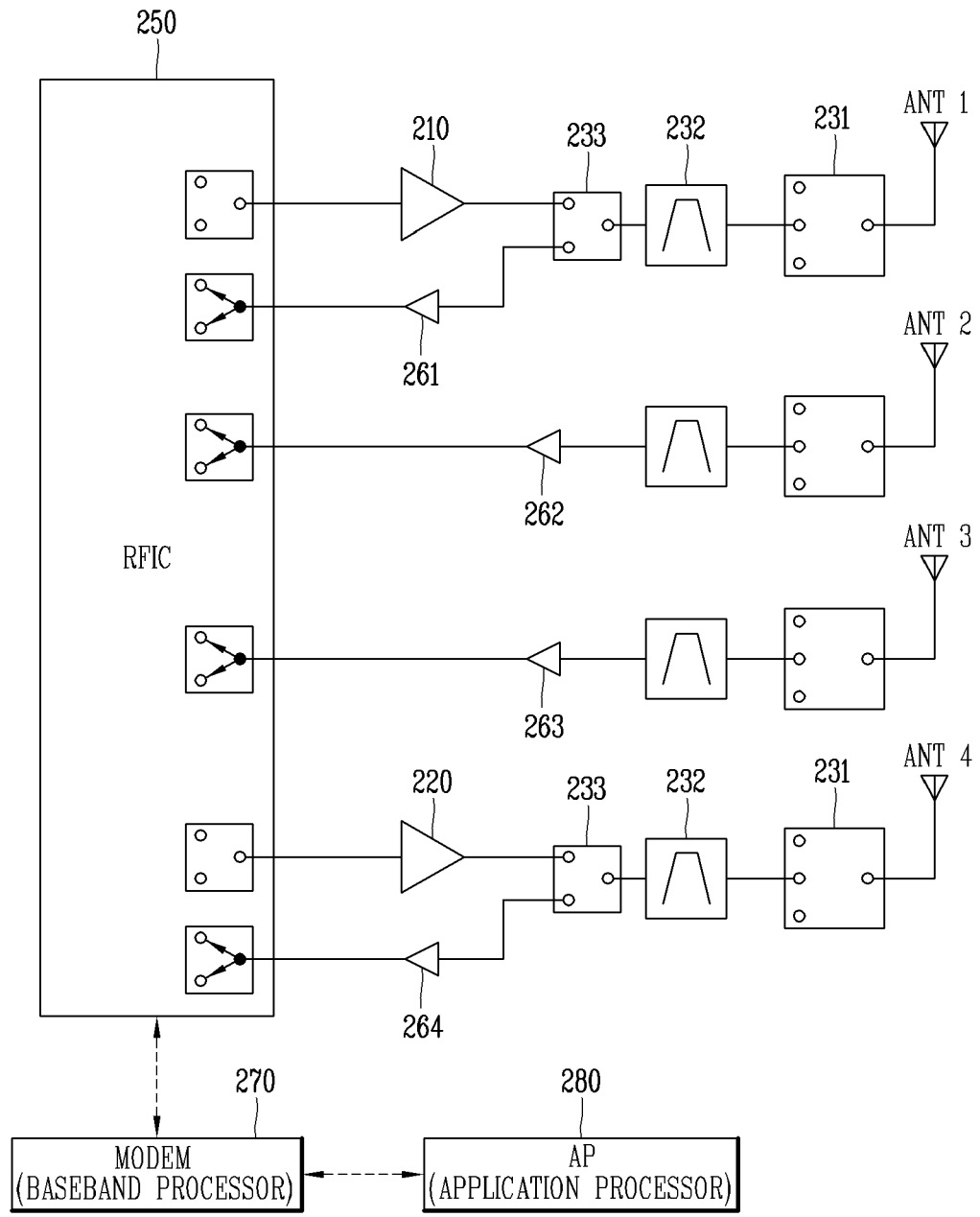
FIG. 3B is a block diagram illustrating a configuration of a wireless communication unit in an electronic device associated with the present disclosure that is operable in a plurality of wireless communication systems.

Next, FIG. 3B illustrates a configuration of a wireless communication unit in an electronic device operable in a plurality of wireless communication systems according to an embodiment. Referring to FIG. 3B, the electronic device includes a first power amplifier 210, a second power amplifier 220, and an RFIC 250. In addition, the electronic device may further include a modem 270 and an application processor 280. Here, the modem 270 and the application processor (AP) 280 may be physically implemented on a single chip, and may be implemented in a logical and functionally separated form. However, the present disclosure is not limited thereto and may be implemented in the form of a chip that is physically separated according to an application.

Further, the electronic device includes a plurality of low noise amplifiers (LNAs) 261 to 264 in the receiver. Here, the first power amplifier 210, the second power amplifier 220, the RFIC 250, and the plurality of low noise amplifiers 261 to 264 are all operable in a first communication system and a second communication system. In this instance, the first communication system and the second communication system may be a 4G communication system and a 5G communication system, respectively.

As illustrated in FIG. 2B, the RFIC 250 may be configured as a 4G/5G integration type, but is not limited thereto, and may also be configured as a 4G/5G separation type according to an application. When the RFIC 250 is configured as a 4G/5G integration type, it is advantageous in terms of synchronization between 4G/5G circuits, and also there is an advantage that control signaling by the modem 270 can be simplified.

In addition, when the RFIC 250 is configured as a 4G/5G separation type, it may be referred to as a 4G RFIC and a 5G RFIC, respectively. In particular, when a band difference between the 5G band and the 4G band is large, such as when the 5G band is configured as a millimeter wave band, the RFIC 250 may be configured as a 4G/5G separation type. As such, when the RFIC 250 is configured as a 4G/5G separation type, there is an advantage that the RF characteristics can be optimized for each of the 4G band and the 5G band.

Meanwhile, even when the RFIC 250 is configured as a 4G/5G separation type, the 4G RFIC and the 5G RFIC may be logically and functionally separated but physically implemented on a single chip. In addition, the application processor (AP) 280 is configured to control the operation of each component of the electronic device. Specifically, the application processor (AP) 280 may control the operation of each component of the electronic device through the modem 270.

For example, the modem 270 can be controlled through a power management IC (PMIC) for low power operation of the electronic device. Accordingly, the modem 270 can operate the power circuits of the transmitter and the receiver in a low power mode through the RFIC 250.

When it is determined that the electronic device is in an idle mode, the application processor (AP) 280 can control the RFIC 250 through the modem 270 as follows. For example, when the electronic device is in an idle mode, the RFIC 250 can be controlled through the modem 270 such that at least one of the first and second power amplifiers 210, 220 operates in a low power mode or is off.

According to another embodiment, the application processor (AP) 280 can control the modem 270 to provide wireless communication capable of performing low power communication when the electronic device is in a low battery mode. For example, when the electronic device is connected to a plurality of entities among a 4G base station, a 5G base station, and an access point, the application processor (AP) 280 can control the modem 270 to enable wireless communication at the lowest power. Accordingly, the application processor (AP) 280 can control the modem 270 and the RFIC 250 to perform short-range communication using only the short-range communication module 113, even at the expense of throughput.

According to another embodiment, when the remaining battery level of the electronic device is above the threshold, the modem 270 can be controlled to select an optimal wireless interface. For example, the application processor (AP) 280 can control the modem 270 to receive data through both the 4G base station and the 5G base station according to the remaining battery level and the available radio resource information. In this instance, the application processor (AP) 280 can receive the remaining battery information from the PMIC, and the available radio resource information from the modem 270. Accordingly, when the remaining battery level and the available radio resources are sufficient, the application processor (AP) 280 can control the modem 270 and the RFIC 250 to receive data through both the 4G base station and 5G base station.

Also, the multi-transceiving system of FIG. 3B may integrate a transmitter and a receiver of each radio system into a single transceiver. Accordingly, there is an advantage in that a circuit portion for integrating two types of system signals may be eliminated at a RF front-end. Furthermore, since the front end parts can be controlled by an integrated transceiver, the front end parts may be more efficiently integrated than when the transceiving system is separated by communication systems.

In addition, when separated by communication systems, it may be impossible to control other communication systems as required, or impossible to perform efficient resource allocation since system delay increases due to this. On the contrary, the multi-transceiving system as shown in FIG. 3B can control other communication systems as needed, thereby minimizing system delay due to this, and thus there is an advantage in that efficient resource allocation is possible.

Also, the first power amplifier 210 and the second power amplifier 220 may operate in at least one of the first and second communication systems. In this regard, when the 5G communication system operates in a 4G band or a sub-6 band, the first and second power amplifiers 210 and 220 may operate in both the first and second communication systems.

On the contrary, when the 5G communication system operates in a millimeter wave (mmWave) band, the first and second power amplifiers 210, 220 may operate in either the 4G band and the other in the millimeter wave band.

In addition, a transmitter and a receiver may be integrated to implement two different wireless communication systems using a single antenna using a dual transmit/receive antenna. Here, 4×4 MIMO may be implemented using four antennas as shown in FIG. 3B. In this instance, 4×4 DL MIMO may be performed through downlink (DL).

Further, when the 5G band is a sub-6 band, first to fourth antennas (ANT1 to ANT4) may be configured to operate in both the 4G band and the 5G band. On the contrary, when the 5G band is a millimeter wave (mmWave) band, the first to fourth antennas (ANT1 to ANT4) may be configured to operate in either one of the 4G band and the 5G band. In this instance, when the 5G band is a millimeter wave (mmWave) band, a plurality of antennas may be individually configured as an array antenna in the millimeter wave band.

Meanwhile, 2×2 MIMO may be implemented using two antennas connected to the first power amplifier 210 and the second power amplifier 220 among four antennas. In this instance, 2×2 UL MIMO (2 Tx) may be performed through uplink (UL). Alternatively, the present disclosure is not limited to 2×2 UL MIMO, and may also be implemented as 1 Tx or 4 Tx. In this instance, when the 5G communication system is implemented with 1 Tx, only one of the first and second power amplifiers 210, 220 may operate in the 5G band. Meanwhile, when the 5G communication system is implemented with 4Tx, an additional power amplifier operating in the 5G band may be further provided. Alternatively, a transmission signal may be branched in each of one or two transmission paths, and the branched transmission signal may be connected to a plurality of antennas.

In addition, a switch-type splitter or power divider is integrated into the RFIC corresponding to the RFIC 250, and an additional component does not need to be disposed externally, thereby improving component mountability. Specifically, the transmitters (TXs) of two different communication systems may be selected using a single-pole double-throw (SPDT) type switch in the RFIC corresponding to the RFIC 250.

In addition, the electronic device that is operable in the plurality of wireless communication systems according to an embodiment may further include a duplexer (231), a filter 232 and a switch 233.

The duplexer 231 is configured to separate signals in a transmission band and a reception band from each other. In this instance, signals in a transmission band transmitted through the first and second power amplifiers 210, 220 are applied to the antennas (ANT1, ANT4) through a first output port of the duplexer 231. On the contrary, a signal in a reception band received through the antennas (ANT1, ANT4) are received by the low noise amplifiers 261, 264 through a second output port of the duplexer 231.

The filter 232 may be configured to pass signals in a transmission band or a reception band and block signals in the remaining bands. In this instance, the filter 232 may include a transmission filter connected to the first output port of the duplexer 231 and a reception filter connected to the second output port of the duplexer 231. Alternatively, the filter 232 may be configured to pass only signals in the transmission band or only signals in the reception band according to a control signal.

The switch 233 is configured to transmit only one of the transmission signal and the reception signal. In an embodiment of the present disclosure, the switch 233 may be configured in a single-pole double-throw (SPDT) type to separate a transmission signal and a reception signal in a time division duplex (TDD) scheme. Here, the transmission signal and the reception signal are signals of the same frequency band, and thus the duplexer 231 may be implemented in the form of a circulator. Meanwhile, in another embodiment of the present disclosure, the switch 233 may also be applicable to a frequency division duplex (FDD) scheme.

In this instance, the switch 233 may be configured in the form of a double-pole double-throw (DPDT) to connect or block a transmission signal and a reception signal, respectively. In addition, the transmission signal and the reception signal may be separated by the duplexer 231, and thus the switch 233 is not necessarily required.

Further, the electronic device according to an embodiment may further include a modem 270 corresponding to the controller. In this instance, the RFIC 250 and the modem 270 may be referred to as a first controller (or a first processor) and a second controller (a second processor), respectively. In addition, the RFIC 250 and the modem 270 may be implemented as physically separated circuits. Alternatively, the RFIC 250 and the modem 270 may be logically or functionally divided into a single circuit.

The modem 270 can perform control and signal processing for the transmission and reception of signals through different communication systems through the RFIC 250. The modem 270 may be acquired through control information received from the 4G base station and/or the 5G base station. Here, the control information may be received through a physical downlink control channel (PDCCH), but the present disclosure is not limited thereto.

The modem 270 can control the RFIC 250 to transmit and/or receive signals through the first communication system and/or the second communication system at specific time and frequency resources. Accordingly, the RFIC 250 can control transmission circuits including the first and second power amplifiers 210, 220 to transmit 4G or 5G signals in a specific time interval. In addition, the RFIC 250 can control reception circuits including first through fourth low noise amplifiers 261 to 264 to receive 4G or 5G signals in a specific time interval.

In addition, a detailed operation and function of the electronic device having a plurality of antennas according to an embodiment provided with a multi-transceiving system as shown in FIG. 3B will be discussed below.

Figure 4A:
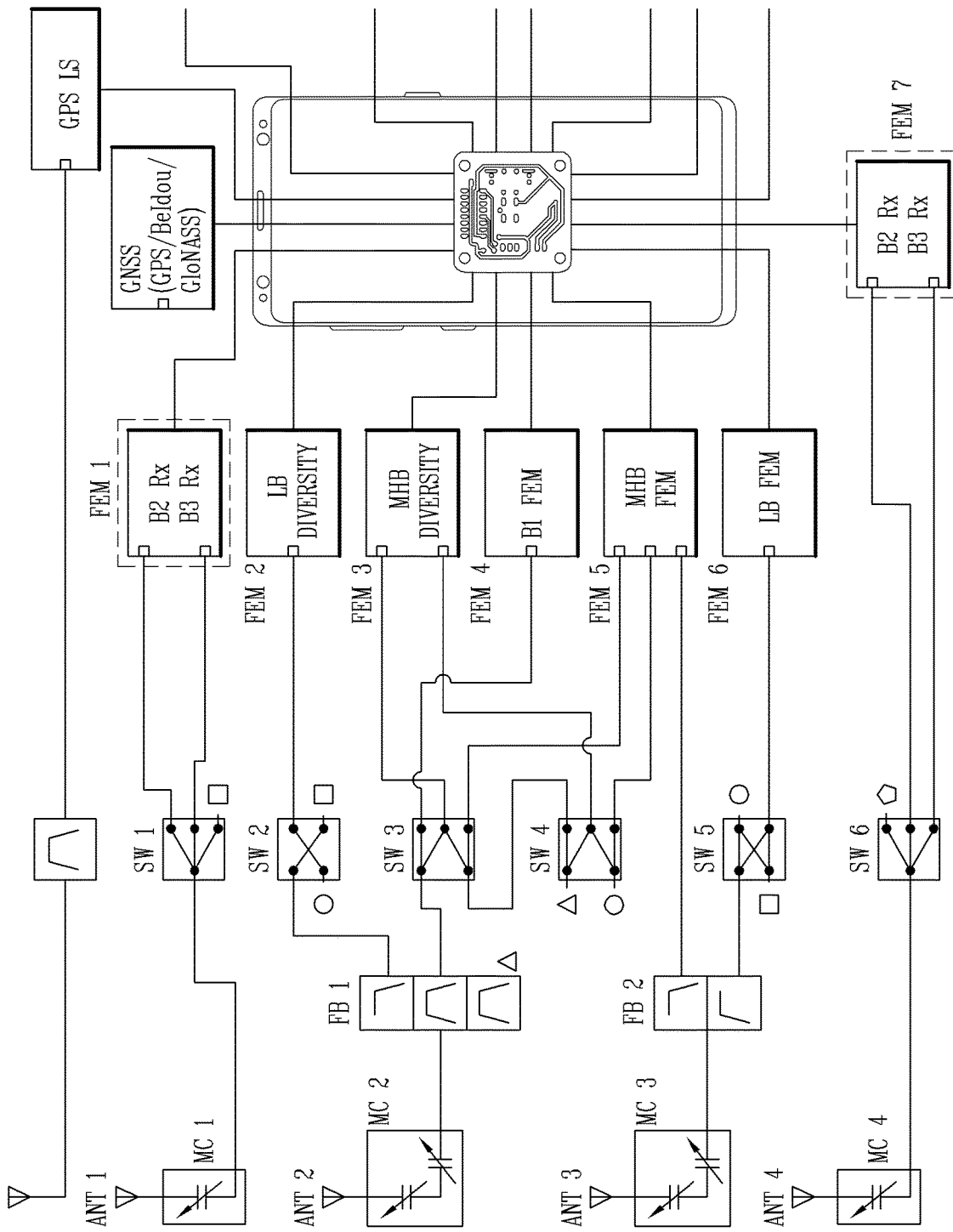
FIG. 4A is a block diagram illustrating a structure in which a plurality of antennas and transceiver circuits are coupled to a processor in an operable manner in an electronic device associated with the present disclosure.
Figure 4B:
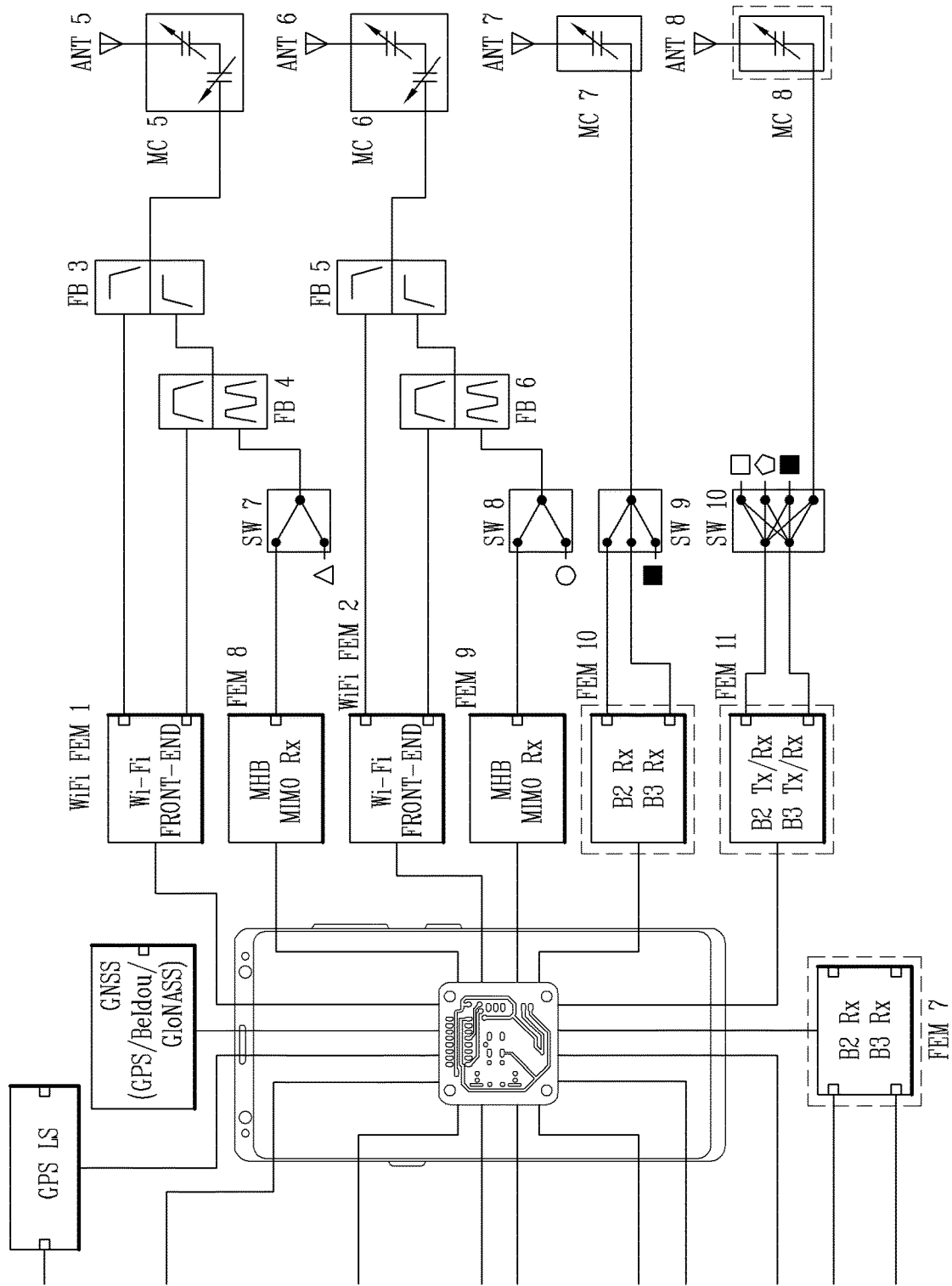
FIG. 4B is a block diagram illustrating a structure in which antennas and transceiver circuits are additionally coupled to a processor in an operable manner in the configuration diagram in FIG. 4A.

In a 5G communication system according to an embodiment, the 5G frequency band may be a sub-6 band. In this regard, FIG. 4A is a configuration diagram in which a plurality of antennas and transceiver circuits according to an embodiment are coupled to a processor in an operable manner. FIG. 4B is a configuration diagram in which antennas and transceiver circuits are additionally coupled to a processor in an operable manner in the configuration diagram in FIG. 4A.

Referring to FIGS. 4A and 4B, the electronic device may include a plurality of antennas (ANT1 to ANT4) and front end modules (FEM1 to FEM7) operating in a 4G band and/or a 5G band. In this regard, a plurality of switches (SW1 to SW6) may be arranged between the plurality of antennas (ANT1 to ANT4) and the front end modules (FEM1 to FEM7).

Referring to FIGS. 4A and 4B, the electronic device may include a plurality of antennas (ANT5 to ANT8) and front end modules (FEM8 to FEM11) operating in a 4G band and/or a 5G band. In this regard, a plurality of switches (SW7 to SW10) may be arranged between the plurality of antennas (ANT1 to ANT4) and the front end modules (FEM8 to FEM11).

Meanwhile, a plurality of signals that can be branched through the plurality of antennas (ANT1 to ANT8) may be transmitted to the input of the front end modules (FEM1 to FEM11) or to the plurality of switches (SW1 to SW10) through one or more filters.

For an example, the first antenna (ANT1) may be configured to receive signals in a 5G band. In this instance, the first antenna (ANT1) may be configured to receive a second signal of a second band (B2) and a third signal of a third band (B3). Here, the second band (B2) may be an n77 band and the third band (B3) may be an n79 band, but the present disclosure is not limited thereto. The second band (B2) and the third band (B3) may be changed according to an application. Meanwhile, the first antenna (ANT1) may also operate as a transmitting antenna in addition to a receiving antenna.

In this regard, the first switch (SW1) may be configured as an SP2T switch or an SP3T switch. When implemented as an SP3T switch, one output port may be used as a test port. The first and second output ports of the first switch (SW1) may be connected to the inputs of the first front end module (FEM1).

In one example, the second antenna (ANT2) may be configured to transmit and/or receive signals in a 4G band and/or a 5G band. In this instance, the second antenna (ANT2) may be configured to transmit/receive a first signal of a first band (B1). Here, the first band (B1) may be an n41 band, but the present is not limited thereto, and the first band (B1) may be changed according to an application.

Meanwhile, the second antenna (ANT2) may operate in a low band (LB). In addition, the second antenna (ANT2) may be configured to operate in a mid band (MB) and/or a high band (HB). Here, the middle band (MB) and high band (HB) may be referred to as MHB.

A first output of the first filter bank (FB1) connected to the second antenna (ANT2) may be connected to the second switch (SW2). Meanwhile, a second output of the first filter bank (FB1) connected to the second antenna (ANT2) may be connected to the third switch (SW3). Furthermore, a third output of the first filter bank (FB1) connected to the second antenna (ANT2) may be connected to the fourth switch (SW4).

Accordingly, an output of the second switch (SW2) may be connected to an input of the second front end module (FEM2) operating in the low band (LB). Meanwhile, a second output of the third switch (SW3) may be connected to an input of the third front end module (FEM3) operating in the MHB band. In addition, a first output of the third switch (SW3) may be connected to an input of a fourth front end module (FEM4) operating in a first 5G band (B1). Furthermore, a third output of the third switch (SW3) may be connected to an input of the fifth front end module (FEM5) operating in the MHB band operating in the first 5G band (B1).

Further, a first output of the fourth switch (SW4) may be connected to an input of the third switch (SW3). Meanwhile, a second output of the fourth switch (SW4) may be connected to an input of the third front end module (FEM3). In addition, a third output of the fourth switch (SW4) may be connected to an input of the fifth front end module (FEM5).

For example, the third antenna (ANT3) can be configured to transmit and/or receive signals in the LB band and/or the MHB band. Further, a first output of the second filter bank (FB2) connected to the second antenna (ANT2) can be connected to an input of the fifth front end module (FEM5) operating in the MHB band. Meanwhile, a second output of the second filter bank (FB2) connected to the second antenna (ANT2) can be connected to the fifth switch (SW5).

Further, an output of the fifth switch (SW5) can be connected to an input of the sixth front end module (FEM6) operating in the LB band.

For example, the fourth antenna (ANT4) may be configured to transmit and/or receive a signal in a 5G band. Further, the fourth antenna (ANT4) may be configured such that the second band B2 that is a transmission band and the third band B3 that is a reception band are frequency-division multiplexed (FDM). Here, the second band (B2) may be an n77 band and the third band (B3) may be an n79 band, but the present disclosure is not limited thereto. The second band (B2) and the third band (B3) may be changed according to an application.

Further, the fourth antenna (ANT4) may be connected to the sixth switch (SW6), and one of the outputs of the sixth switch (SW6) may be connected to a reception port of the seventh front end module (FEM7). Meanwhile, another one of the outputs of the sixth switch (SW6) may be connected to the transmission port of the seventh front end module (FEM7). For example, the fifth antenna (ANT5) may be configured to transmit and/or receive signals in a WiFi band. Furthermore, the fifth antenna (ANT5) may be configured to transmit and/or receive signals in the MHB band.

Further, the fifth antenna (ANT5) may be connected to the third filter bank (FB3), and a first output of the third filter bank (FB3) may be connected to a first WiFi module (WiFi FEM1). In addition, a second output of the third filter bank (FB3) may be connected to a fourth filter bank FB4. In addition, a first output of the fourth filter bank (FB4) may be connected to the first WiFi module (WiFi FEM1). Meanwhile, a second output of the fourth filter bank (FB4) may be connected to the eighth front end module (FEM8) operating in the MHB band through the seventh switch (SW7).

Therefore, the fifth antenna (ANT5) may be configured to receive WiFi band and 4G/5G band signals.

Similarly, the sixth antenna (ANT6) may be configured to transmit and/or receive signals in a WiFi band. Furthermore, the sixth antenna (ANT6) may be configured to transmit and/or receive signals in the MHB band.

Further, the sixth antenna (ANT6) may be connected to a fifth filter bank (FB5), and a first output of the fifth filter bank (FB5) may be connected to a second WiFi module (WiFi FEM2). In addition, a second output of the fifth filter bank (FB5) may be connected to a sixth filter bank (FB6). In addition, a first output of the sixth filter bank (FB6) may be connected to a second WiFi module (WiFi FEM2). A second output of the sixth filter bank (FB6) may be connected to the ninth front end module (FEM9) operating in the MHB band through the eighth switch (SW8). Therefore, the sixth antenna (ANT6) may be configured to receive the WiFi band and 4G/5G band signals.

Referring to FIGS. 3B, 4A, and 4B, the baseband processor, that is, the modem 270, can control antennas and the transceiver circuit (RFIC) 250 to perform multi-input multi-output (MIMO) or diversity in the MHB band. Further, the second antenna (ANT2) and the third antenna (ANT3) adjacent thereto may be used in a diversity mode for transmitting and/or receiving the same information as a first signal and a second signal. On the contrary, antennas disposed on different side surfaces may be used in the MIMO mode in which first information is included in the first signal and second information is included in the second signal. For example, the baseband processor 1400 may perform MIMO through the second antenna (ANT2) and the fifth antenna (ANT5). In another example, the baseband processor, that is, the modem 270, may perform MIMO through the second antenna (ANT2) and the sixth antenna (ANT6).

For example, the seventh antenna (ANT7) may be configured to receive signals in a 5G band. In this instance, the seventh antenna (ANT7) may be configured to receive a third signal of a second band (B2) and a third signal of a third band (B3). Here, the second band (B2) may be an n77 band and the third band (B3) may be an n79 band, but the present disclosure is not limited thereto. The second band (B2) and the third band (B3) may be changed according to an application. Meanwhile, the seventh antenna ANT7 may also operate as a transmitting antenna in addition to a receiving antenna.

Further, the ninth switch (SW9) may be configured as an SP2T switch or an SP3T switch. When implemented as an SP3T switch, one output port may be used as a test port. In addition, the first and second output ports of the ninth switch (SW9) may be connected to the inputs of the tenth front end module FEM10.

For example, the eighth antenna (ANT8) may be configured to transmit and/or receive signals in the 4G band and/or the 5G band. In this instance, the eighth antenna (ANT8) may be configured to transmit/receive a signal of the second band (B2). In addition, the eighth antenna (ANT8) may be configured to transmit/receive a signal of the third band (B3). Here, the second band (B2) may be an n77 band and the third band (B3) may be an n79 band, but the present disclosure is not limited thereto. The second band (B2) and the third band (B3) may be changed according to an application. Further, the eighth antenna (ANT8) may be connected to the eleventh front end module FEM1*l* through the tenth switch (SW10).

Meanwhile, the antennas (ANT1 to ANT8) may be connected to impedance matching circuits (MC1 to MC8) to operate in a plurality of bands. Further, when operating in adjacent bands such as the first antenna (ANT1), the fourth antenna (ANT4), the seventh antenna (ANT7) and the eighth antenna (ANT8), only one variable element may be used. In this instance, the variable element may be a variable capacitor configured to vary the capacitance by varying the voltage.

On the contrary, when operating in spaced bands such as the second antenna (ANT2), the third antenna (ANT3), the fifth antenna (ANT5), and the sixth antenna (ANT6), only two or more variable elements may be used. In this instance, the two or more variable elements may be two or more variable capacitors or a combination of variable inductors and variable capacitors.

Referring to FIGS. 3B, 4A, and 4B, the baseband processor 270 may perform MIMO through at least one of the second band (B2) and the third band B3 in a 5G band. Further, the baseband processor 270 may perform MIMO through at least two of the first antenna (ANT1), the fourth antenna (ANT4), the seventh antenna (ANT7), and the eighth antenna (ANT8) in the second band (B2). In addition, the baseband processor 270 may perform MIMO through at least two of the first antenna (ANT1), the fourth antenna (ANT4), the seventh antenna (ANT7), and the eighth antenna (ANT8) in the third band (B3). Accordingly, the baseband processor 270 can control the plurality of antennas and the transceiver circuit 250 to support MIMO up to 4 RXs as well as 2 RXs in the 5G band.

Figure 5:
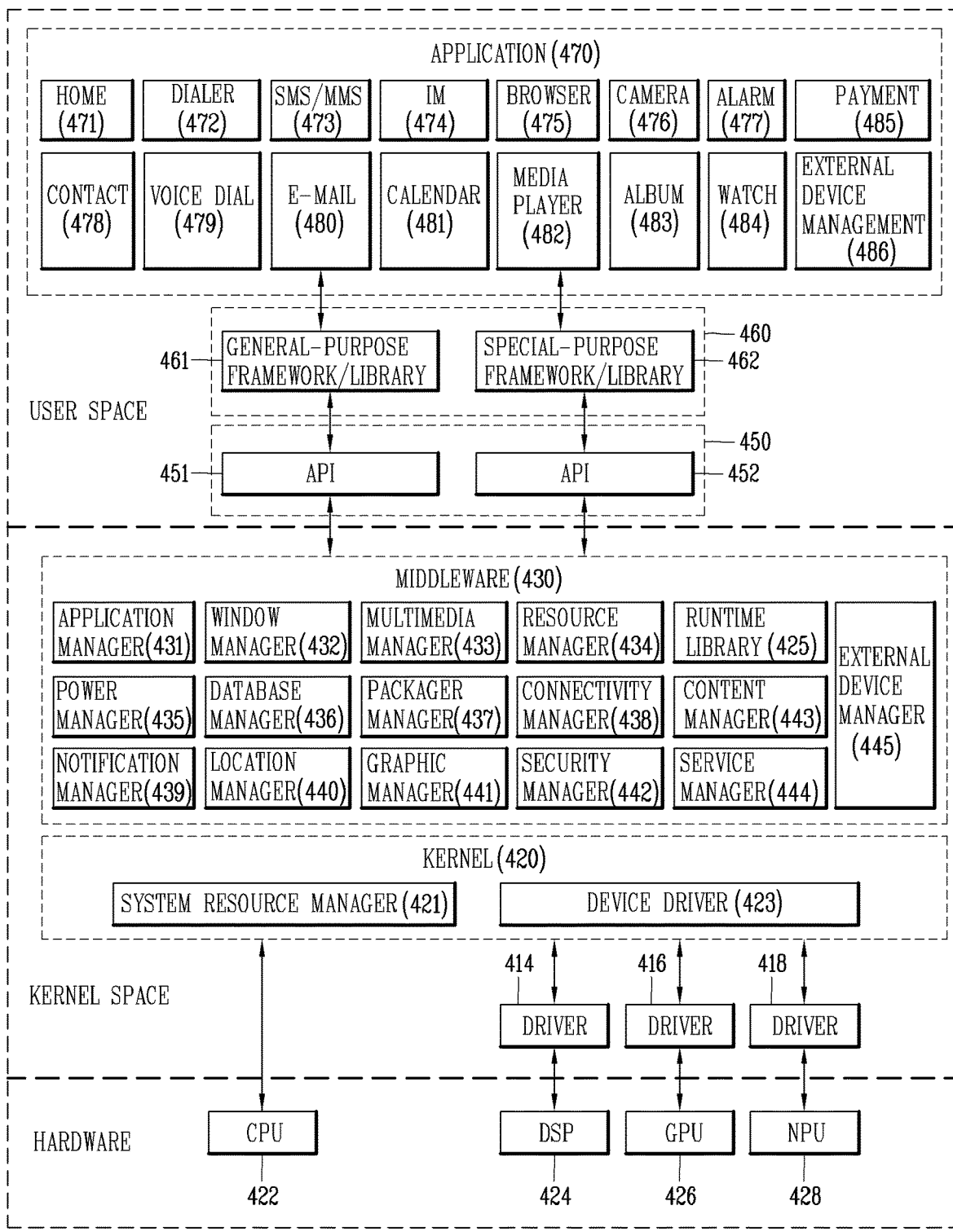
FIG. 5 is a conceptual view illustrating a framework structure associated with an application program operating in an electronic device associated with the present disclosure.

Meanwhile, as shown in FIG. 5, an application program operating in the electronic device described herein may be executed in conjunction with a user space, a kernel space, and hardware. Further, the program module 410 may include a kernel 420, middleware 430, an API 450, a framework/library 460, and/or an application 470. At least part of the program module 410 may be pre-loaded on an electronic device or downloaded from an external device or a server.

The kernel 420 may include a system resource manager 421 and/or a device driver 423. The system resource manager 421 may perform control, allocation, or retrieval of system resources. According to one embodiment, the system resource manager 421 may include a process manager, a memory manager, or a file system manager. The device driver 423 may include a display driver, a camera driver, a Bluetooth driver, a shared memory driver, a USB driver, a keypad driver, a WiFi driver, an audio driver, or an inter-process communication (IPC) driver. The middleware 430 may provide functions commonly required by the application 470 or provide various functions to the application 470 through the API 460, for example, to allow the application 470 to use limited system resources inside the electronic device.

The middleware 430 may include at least one of a runtime library 425, an application manager 431, a window manager 432, a multimedia manager 433, a resource manager 434, a power manager 435, a database manager 436, a package manager 437, a connectivity manager 438, a notification manager 439, a location manager 440, a graphic manager 441, a security manager 442, a content manager 443, a service manager 444 and an external device manager 445.

The framework/library 460 may include a general-purpose framework/library 461 and a special-purpose framework/library 462. Here, the general-purpose framework/library 461 and the special-purpose framework/library 462 may be referred to as a first framework/library 461 and a second framework/library 462, respectively. The first framework/library 461 and the second framework/library 462 may be interfaced with a kernel space and hardware through the first API 451 and the second API 452, respectively. Here, the second framework/library 462 may be an exemplary software architecture capable of modularizing artificial intelligence (AI) functions. Using the architecture, the various processing blocks of hardware implemented with a System on Chip (SoC) (e.g., CPU 422, DSP 424, GPU 426, and/or NPU 428) may perform functions for supporting operations during the runtime operation of the application 470.

The application 470 may include a home 471, a dialer 472, an SMS/MMS 473, an instant message 474, a browser 475, a camera 476, an alarm 477, a contact 478, a voice dial 479, an email 480, a calendar 481, a media player 482, an album 483, a watch 484, a payment 485, an accessory management 486, a health care, or an environmental information providing application.

An AI application may be configured to call functions defined in a user space capable of allowing the electronic device to provide for detection and recognition of a scene indicating a location at which it is currently operating. The AI application may configure a microphone and a camera differently depending on whether the recognized scene is an indoor space or an outdoor space. The AI application may make a request for compiled program codes associated with a library defined in a scene detect application programming interface (API) to provide an estimate of the current scene. This request may rely on the output of a deep neural network configured to provide scene estimates based on video and location data.

The framework/library 462, which may be compiled codes of the Runtime Framework, may be further accessible by the AI application. The AI application may cause a runtime framework engine to request scene estimation triggered at specific time intervals or by events detected by the application's user interface. When estimating a scene, the runtime engine may then send a signal to an operating system such as a Linux kernel running on the SoC. The operating system may cause the operation to be performed on the CPU 422, the DSP 424, the GPU 426, the NPU 428, or some combination thereof. The CPU 422 may be accessed directly by the operating system and other processing blocks may be accessed via a driver such as a driver 414 to 418 for the DSP 424, the GPU 426, or the NPU 428. In an illustrative example, a deep neural network and an AI algorithm may be configured to run on a combination of processing blocks, such as the CPU 422 and the GPU 426, or an AI algorithm such as a deep neural network may run on the NPU 428.

The AI algorithm performed through the special-purpose framework/library as described above may be performed only by the electronic device or by a server supported scheme. When the AI algorithm is performed by the server supported scheme, the electronic device may receive and transmit information associated with the AI server and AI processing through the 4G/5G communication system.

Figure 6A:
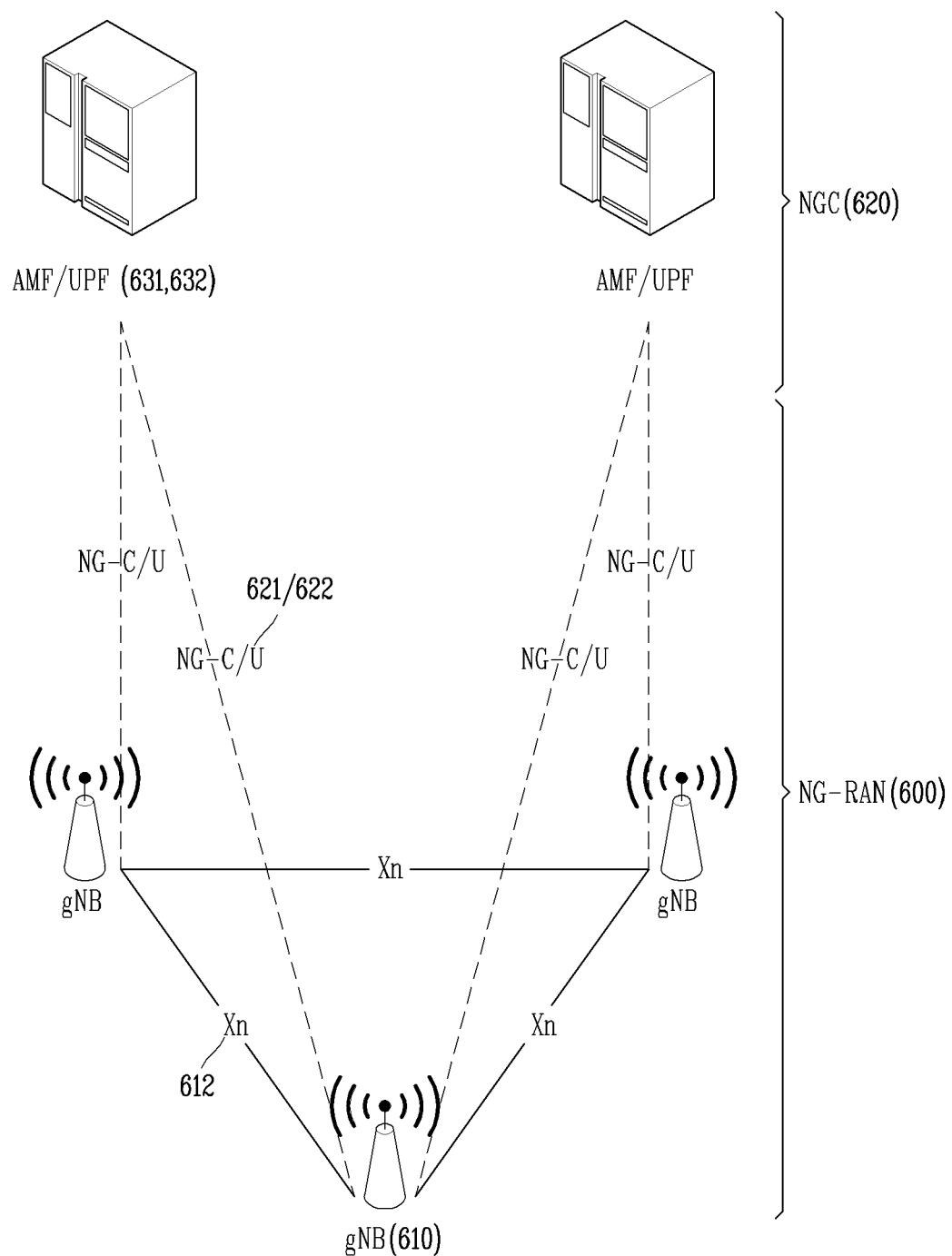
FIGS. 6A and 6B are structural diagrams illustrating the structure of a wireless communication system in an electronic device associated with the present disclosure.

Referring to FIG. 6A, a Next Generation Radio Access Network (NG-RAN) 600 consists of gNBs 310 that provide control plane (RRC) protocol terminations for a user plane (new sublayer/PDCP/RLC/MAC/PHY) and a user equipment (UE). The gNBs 610 are interconnected via an Xn interface 612. The gNB 610 is also connected to a Next Generation Core (NGC) 620 via an NG interface. More specifically, the gNB 610 is connected to an Access and Mobility Management Function (AMF) 631 through an N2 interface, and to a User Plane Function (UPF) 632 through an N3 interface.

In addition, the NG-C interface 621 may denote a control plane interface between the NG-RAN 600 and the NGC 620. In addition, the NG-U interface 622 may denote a user plane interface between the NG-RAN 600 and the NGC 620. More specifically, in the control plane, functions related to interface management and error handling (e.g. setup, reset, component removal, update), connection mode and mobility management (handover procedure, sequence number and state management, terminal context recovery), RAN paging support, and dual connectivity (addition, reset, modification, releasing of a secondary node) may be carried out. Meanwhile, the user plane may perform functions related to transfer of data or flow control of data.

Meanwhile, a wireless communication system including the electronic device and the base station (gNB) described with reference to FIG. 6A will be described below. Further, FIG. 6B illustrates a block diagram of a wireless communication system that is applicable to methods proposed herein.

Figure 6B:
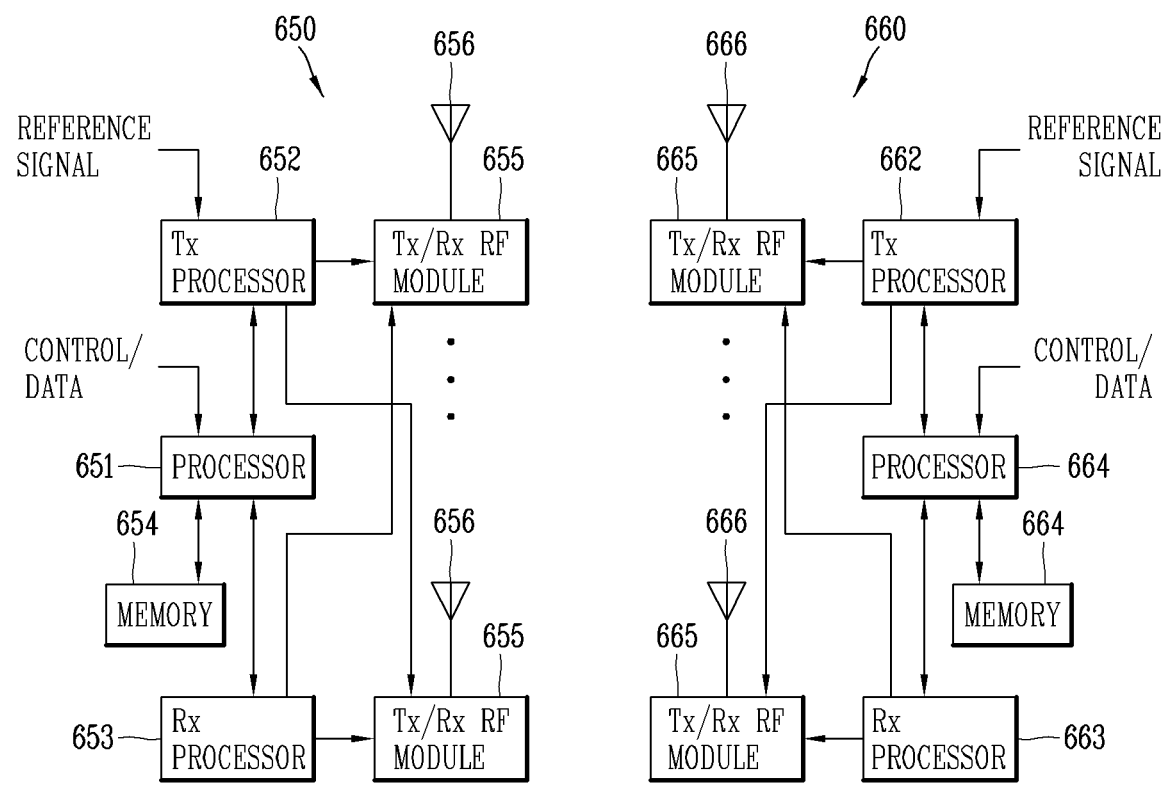

Referring to FIG. 6B, the wireless communication system includes a first communication device 650 and/or a second communication device 660. "A and/or B" may be interpreted to denote the same as "comprising at least one of A and B". The first communication device may represent a base station, and the second communication device may represent a terminal (or the first communication device may represent a terminal, and the second communication device may represent a base station).

The base station (BS) may be replaced with a term such as a fixed station, a Node B, an evolved-NodeB (eNB), a Next Generation NodeB (gNB), a base transceiver system (BTS), an access point (AP), or a general NB (gNB), a 5G system, a network, an AI system, a road side unit (RSU), robot or the like.

In addition, a terminal may be fixed or mobile, and may include a user equipment (UE), a mobile station (MS), a user terminal (UT), a mobile subscriber station (MSS), a subscriber station (SS), and an advanced mobile (AMS), a wireless terminal (WT), a machine-type communication (MTC) device, an machine-to-machine (M2M) device, a device-to-device (D2D) device, a vehicle, a robot, an AI module or the like.

The first communication device 650 and the second communication device 660 are processors 651, 661, memories 654, 664, one or more Tx/Rx RF modules 655, 665, Tx processors 652, 662, Rx processors 653, 663, and antennas 656, 666. The processors 651, 661 implement functions, processes and/or methods described above and functions, processes and/or methods described below. More specifically, in the DL (communication from the first communication device 650 to the second communication device 660), upper layer packets from the core network (NGC) are provided to the processor 651. The processor 651 implements a function of a L2 layer. In the DL, the processor 651 provides multiplexing, radio resource allocation between a logical channel and a transport channel to the second communication device 660, and is responsible for signaling to the second communication device 660.

A transmit (TX) processor 652 implements various signal processing functions for a L1 layer (i.e., physical layer). The signal processing functions facilitate forward error correction (FEC) in the second communication device 660, and include coding and interleaving. The encoded and modulated symbols are divided into parallel streams, and each stream is mapped to an OFDM subcarrier, and multiplexed with a reference signal (RS) in a time and/or frequency domain, and combined together using an Inverse Fast Fourier Transform (IFFT) to create a physical channel carrying a time-domain OFDMA symbol stream.

An OFDM stream is spatially precoded to produce multiple spatial streams. Each spatial stream may be provided to different antennas 656 through individual Tx/Rx modules (or transceivers 655). Each Tx/Rx module may modulate an RF carrier with each spatial stream for transmission.

In the second communication device 660, each Tx/Rx module (or transceiver) 665 receives a signal through each antenna 666 of each Tx/Rx module 665. The each Tx/Rx module 665 recovers information modulated onto an RF carrier, and provides it to the receive (RX) processor 663. The RX processor 663 implements various signal processing functions of layer 1. The RX processor 663 may perform spatial processing on the information to recover any spatial streams destined for the second communication device 660. If multiple spatial streams are directed to the second communication device 660, they may be combined into a single OFDMA symbol stream by multiple RX processors 663. The RX processor 663 converts the OFDMA symbol stream from a time domain to a frequency domain using fast Fourier transform (FFT).

The frequency domain signal includes an individual OFDMA symbol stream for each subcarrier of the OFDM signal. The symbols and reference signal on each subcarrier are recovered and demodulated by determining the most likely signal placement points transmitted by the first communication device. Such soft decisions may be based on channel estimate values. The soft decisions are decoded and deinterleaved to recover data and control signals originally transmitted by the first communication device 650 on the physical channel. The corresponding data and control signals are provided to the processor 661.

The UL (communication from the second communication device 660 to the first communication device 650) is processed at the first communication device 650 in a similar manner to that described in connection with a receiver function at the second communication device 660. Each Tx/Rx module 665 receives a signal via each antenna 666. Each Tx/Rx module 665 provides an RF carrier and information to the RX processor 663. The processor 661 may be associated with the memory 664 that stores program codes and data. The memory 664 may be referred to as a computer readable medium.

Meanwhile, referring to the drawings described above, a 5G wireless communication system, that is, 5G new radio access technology (NR) may be provided. Further, as more communication devices demand larger communication capacities, there is a need for improved mobile broadband communication as compared to radio access technology in the related art. In addition, massive MTC (Machine Type Communications), which connects multiple devices and objects to provide various services anytime and anywhere, is also one of major issues to be considered in next-generation communication. In addition, communication system design in consideration of services/terminals that are sensitive to reliability and latency is being discussed. As described above, introduction of next-generation radio access technology in consideration of enhanced mobile broadband communication (eMBB), massive MTC (mMTC), ultra-reliable and low latency communication (URLLC), and the like, is being discussed, and the relevant technology is referred to herein as NR for the sake of convenience. The NR is an expression showing an example of 5G radio access technology (RAT).

Anew RAT system including the NR uses an OFDM transmission scheme or a similar transmission scheme. The new RAT system may follow OFDM parameters different from the OFDM parameters of LTE. Alternatively, the new RAT system may follow the existing numerology of LTE/LTE-A as it is but have a larger system bandwidth (e.g., 100 MHz). Alternatively, a single cell may support a plurality of numerologies. In other words, electronic devices operating with different numerologies may coexist in a single cell.

Further, in the case of 4G LTE, since the maximum bandwidth of the system is limited to 20 MHz, a single sub-carrier spacing (SCS) of 15 kHz is used. However, since 5G NR supports a channel bandwidth between 5 MHz and 400 MHz, FFT processing complexity may increase to process the entire bandwidth through a single subcarrier spacing. Accordingly, the subcarrier spacing used for each frequency band may be extended and applied.

A numerology corresponds to one subcarrier spacing in the frequency domain. By scaling a reference subcarrier spacing to an integer N, different numerologies may be defined. Further, FIG. 4A shows an example of a frame structure in NR. In addition, FIG. 4B shows a change in a slot length in accordance with a change in the subcarrier spacing in the NR.

An NR system may support a number of numerologies. Here, a numerology may be defined by a subcarrier spacing and a cyclic prefix overhead. Here, a plurality of subcarrier spacings may be derived by scaling a basic subcarrier spacing to an integer N. Furthermore, even when it is assumed that a very low subcarrier spacing is not used at a very high carrier frequency, the used numerology may be selected independently of the frequency band. In addition, in an NR system, various frame structures according to a number of numerologies may be supported.

Hereinafter, an Orthogonal Frequency Division Multiplexing (OFDM) numerology and frame structure that can be considered in the NR system will be described. A number of OFDM numerologies supported in the NR system may be defined as shown in Table 1 below.

TABLE 1

| μ | $\Delta f = 2^\mu * 15$ [kHz] | Cyclic prefix(CP) |
|---|---|---|
| 0 | 15 | Normal |
| 1 | 30 | Normal |
| 2 | 60 | Normal, Extended |
| 3 | 120 | Normal |
| 4 | 240 | Normal |

NR supports a number of numerologies (or subcarrier spacings (SCSs)) for supporting various 5G services. For example, NR supports a wide area in traditional cellular bands when the SCS is 15 kHz, and supports a dense-urban, a lower latency and a wider carrier bandwidth when the SCS is 30 kHz/60 kHz, and supports a bandwidth greater than 24.25 GHz to overcome phase noise when the SCS is 60 kHz or higher.

The NR frequency band is defined as a frequency range of two types (FR1, FR2). The FR1 is a sub-6 GHz range, and the FR2 is a range of above 6 GHz, which may denote millimeter waves (mmWs).

Table 2 below shows the definition of the NR frequency band.

TABLE 2

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

Figure 7A:
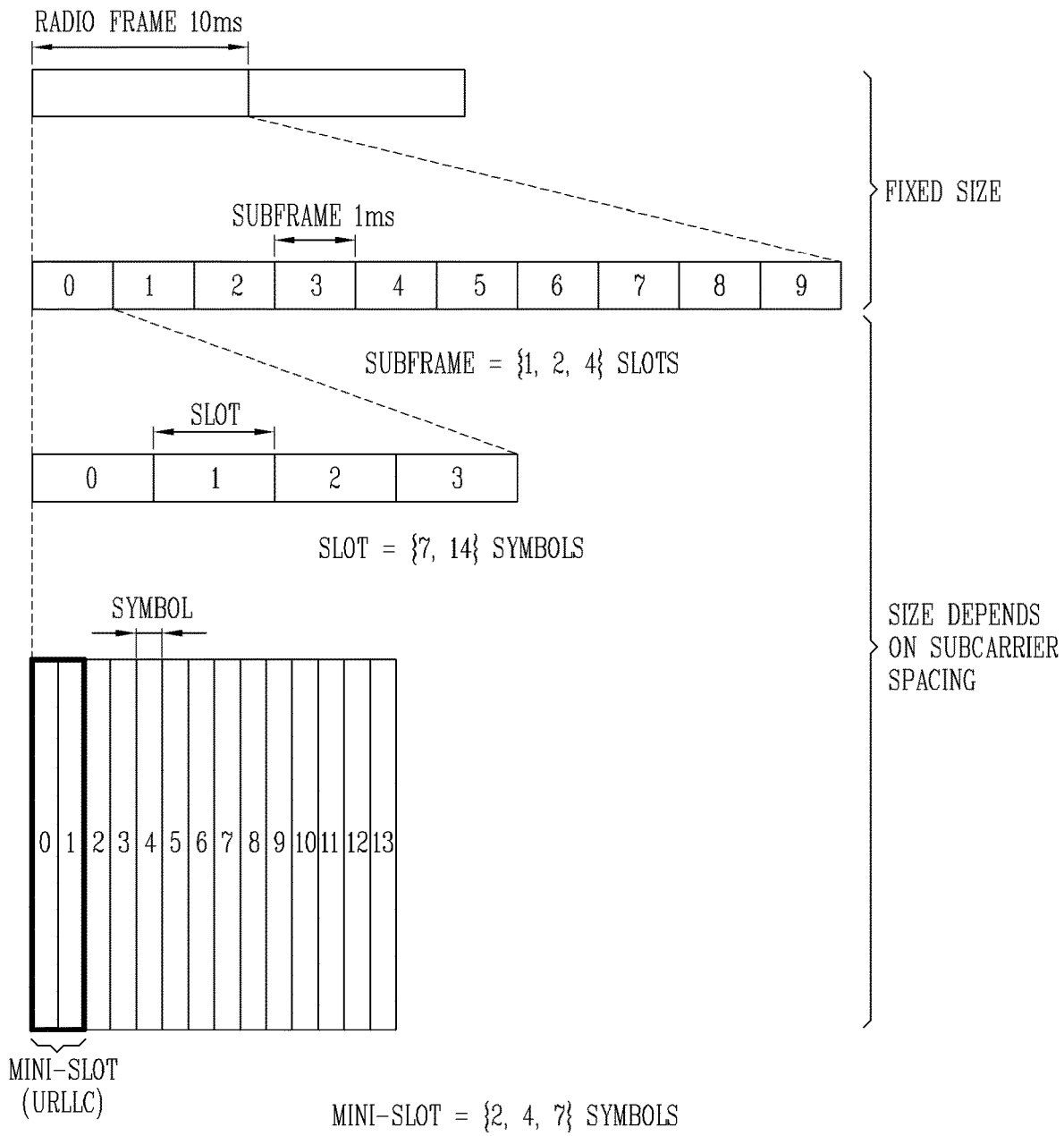

With regard to a frame structure in a NR system, the sizes of various fields in the time domain are expressed in multiples of a specific time unit. FIG. 7A illustrates an example of an SCS of 60 kHz, in which one subframe may include four slots. One subframe={1,2,4} slots shown in FIG. 7A is an example, in which the number of slot(s) that can be included in one subframe may be one, two or four. Furthermore, a mini-slot may include two, four or seven symbols or may include more or fewer symbols.

Referring to FIG. 7B, a subcarrier spacing of 5G NR phase 1 and an OFDM symbol length according thereto are shown. Each subcarrier spacing is extended by a multiplier of two, which inversely reduces the symbol length. In FR1, subcarrier spacings of 15 kHz, 30 kHz, and 60 kHz are available, depending on the frequency band/bandwidth. In FR2, 60 kHz and 120 kHz may be used for data channels, and 240 kHz may be used for synchronization signals.

In 5G NR, a basic unit of scheduling may be defined as a slot, and the number of OFDM symbols included in a single slot may be limited to 14 as shown in FIG. 7A or 7B regardless of the subcarrier spacing. Referring to FIG. 7B, when a wide subcarrier spacing is used, the length of one slot may decrease in inverse proportion to reduce transmission delay in a wireless section. In addition, in order to efficiently support ultra reliable low latency communication (uRLLC), in addition to slot-based scheduling, mini-slot (e.g., 2, 4, 7 symbols) unit scheduling may be supported as described above.

In consideration of the foregoing technical features, slots in 5G NR described herein may be provided at the same interval as those in 4G LTE or may be provided with slots of various sizes. For example, in 5G NR, the slot interval may be configured to be 0.5 ms equal to that of 4G LTE. For another example, the slot interval in 5G NR may be configured to be 0.25 ms, which is a narrower interval than that of 4G LTE.

Further, the 4G communication system and the 5G communication system may be referred to as a first communication system and a second communication system, respectively. Accordingly, a first signal (first information) of the first communication system may be a signal (information) in a 5G NR frame having a slot interval that is scalable to 0.25 ms, 0.5 ms, and the like. On the contrary, a second signal (second information) of the second communication system may be a signal (information) in a 4G LTE frame having a fixed slot interval of 0.5 ms.

Meanwhile, the first signal of the first communication system may be transmitted and/or received through a maximum bandwidth of 20 MHz. On the contrary, the second signal of the second communication system may be transmitted and/or received through a variable channel bandwidth of 5 MHz to 400 MHz. Further, the first signal of the first communication system may be FFT-processed at a single sub-carrier spacing (SCS) of 15 kHz.

In addition, the second signal of the second communication system may be FFT-processed at subcarrier spacings of 15 kHz, 30 kHz, and 60 kHz according to the frequency band/bandwidth. In this instance, the second signal of the second communication system may be modulated and frequency-converted into a FR1 band and transmitted through a 5G sub-6 antenna. Meanwhile, the FR1 band signal received through the 5G sub-6 antenna may be frequency-converted and demodulated. Then, the second signal of the second communication system may be IFFT-processed at subcarrier spacings of 15 kHz, 30 kHz, and 60 kHz according to the frequency band/bandwidth.

In addition, the second signal of the second communication system may be FFT-processed at spacings of 60 kHz, 120 kHz, and 240 kHz according to the frequency band/ bandwidth and data/synchronous channel. In this instance, the second signal of the second communication system may be modulated in a FR2 band and transmitted through a 5G mmWave antenna. Meanwhile, the FR2 band signal received through the 5G mmWave antenna may be frequency converted and demodulated. Then, the second signal of the second communication system may be IFFT-processed through subcarrier spacings of 60 kHz, 120 kHz, and 240 kHz according to the frequency band/bandwidth and data/ synchronous channel.

In 5G NR, symbol-level time alignment may be used for transmission schemes using various slot lengths, mini-slots, and different subcarrier spacings. Accordingly, the present disclosure provides flexibility to efficiently multiplex various communication services such as enhancement mobile broadband (eMBB) and ultra reliable low latency communication (uRLLC) in the time domain and the frequency domain. In addition, unlike 4G LTE, 5G NR may define uplink/downlink resource allocation at a symbol level within a single slot as shown in FIG. 3B. In order to reduce a hybrid automatic repeat request (HARQ) delay, a slot structure capable of directly transmitting HARQ ACK/NACK in a transmission slot may be defined. This slot structure may be referred to as a self-contained structure.

Unlike 4G LTE, 5G NR may support a common frame structure constituting an FDD or TDD frame through a combination of various slots. Accordingly, a dynamic TDD scheme may be adopted to freely dynamically adjust the transmission direction of individual cells according to traffic characteristics.

Figure 8A:
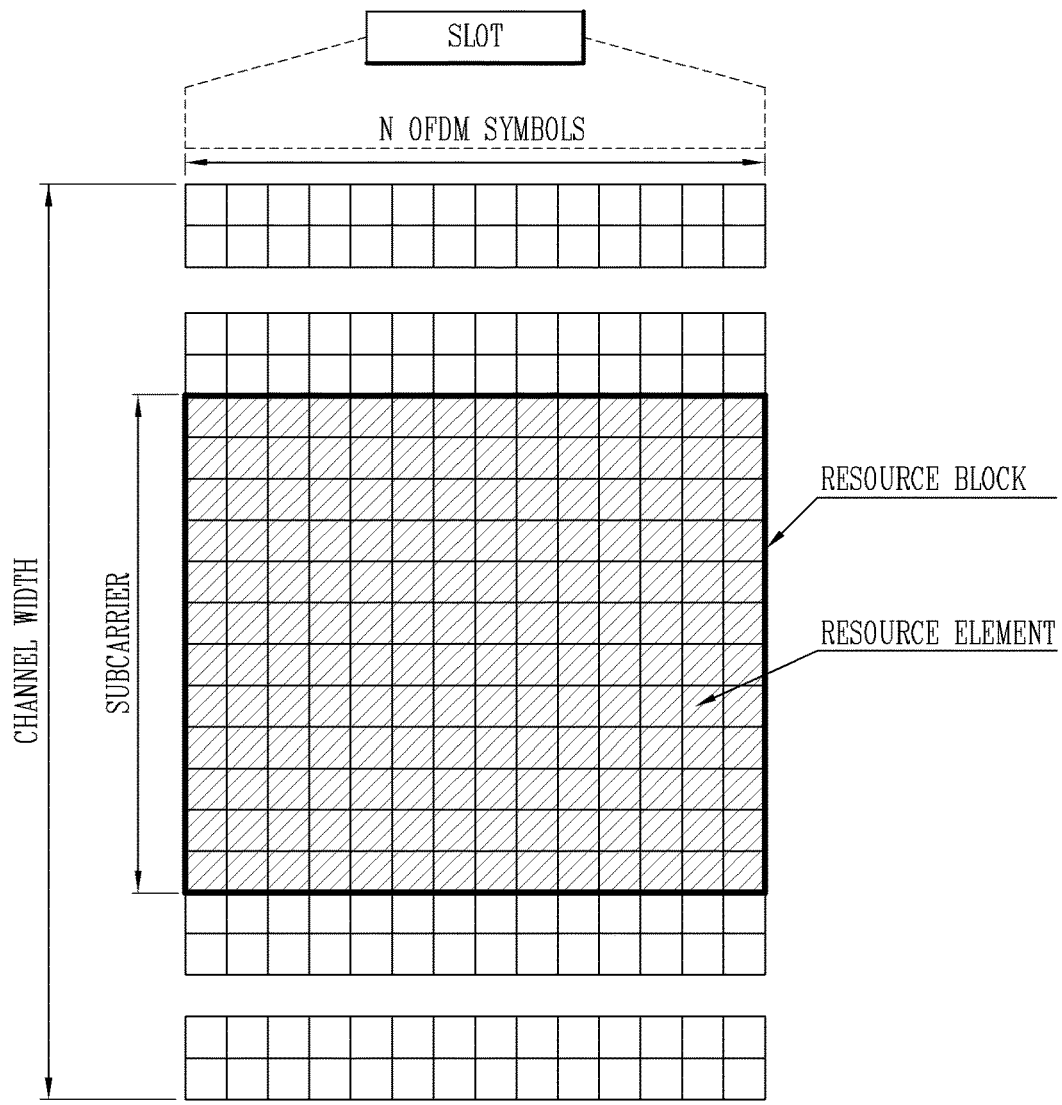
FIGS. 8A and 8B are conceptual diagrams illustrating a time and frequency resource structure according to a 5G communication scheme.

Meanwhile, a resource structure of the time domain and the frequency domain may define an NR resource grid as shown in FIG. 8A. According to the subcarrier spacing (SCS), the resource grid may be changed as the number of available subcarriers and OFDM symbols varies. In other words, with regard to each numerology and carrier, NR may define a resource grid having a width, which is a value of the maximum number of resource blocks per subcarrier spacing multiplied by the number of subcarriers per resource block and a length, which is a value determined by the number of OFDM symbols per subframe.

Figure 8B:
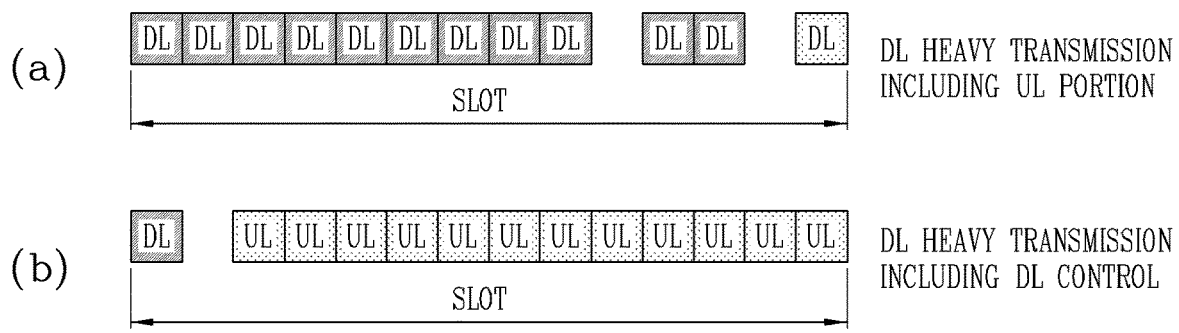

In addition, to support the agile and efficient use of TDD resources, the NR may implement a flexible slot structure. For example, as shown in (a) and (b) of FIG. 8B, a slot may be allocated with all DLs (DownLinks) and all ULs (UploadLinks). Alternatively, a mixture of DLs and ULs may be allocated to service asymmetric traffic. DL control may take place at the beginning of the slot, UL control may take place at the end thereof, and a mixed DL/UL slot may be statically configured as in an LTE DL/UL TDD configuration, or the allocation of a DL/UL mixture can be dynamically changed. Therefore, efficiency and scheduling may be improved according to traffic requirements.

In addition, the electronic device 100 described herein may maintain a connection state between a 4G base station (eNB) and a 5G base station (eNB) through the 4G wireless communication module 111 and/or the 5G wireless communication module 112. Further, as described above, FIG. 9 illustrates a configuration in which the electronic device 100 is interfaced with a plurality of base stations or network entities.

Figure 9:
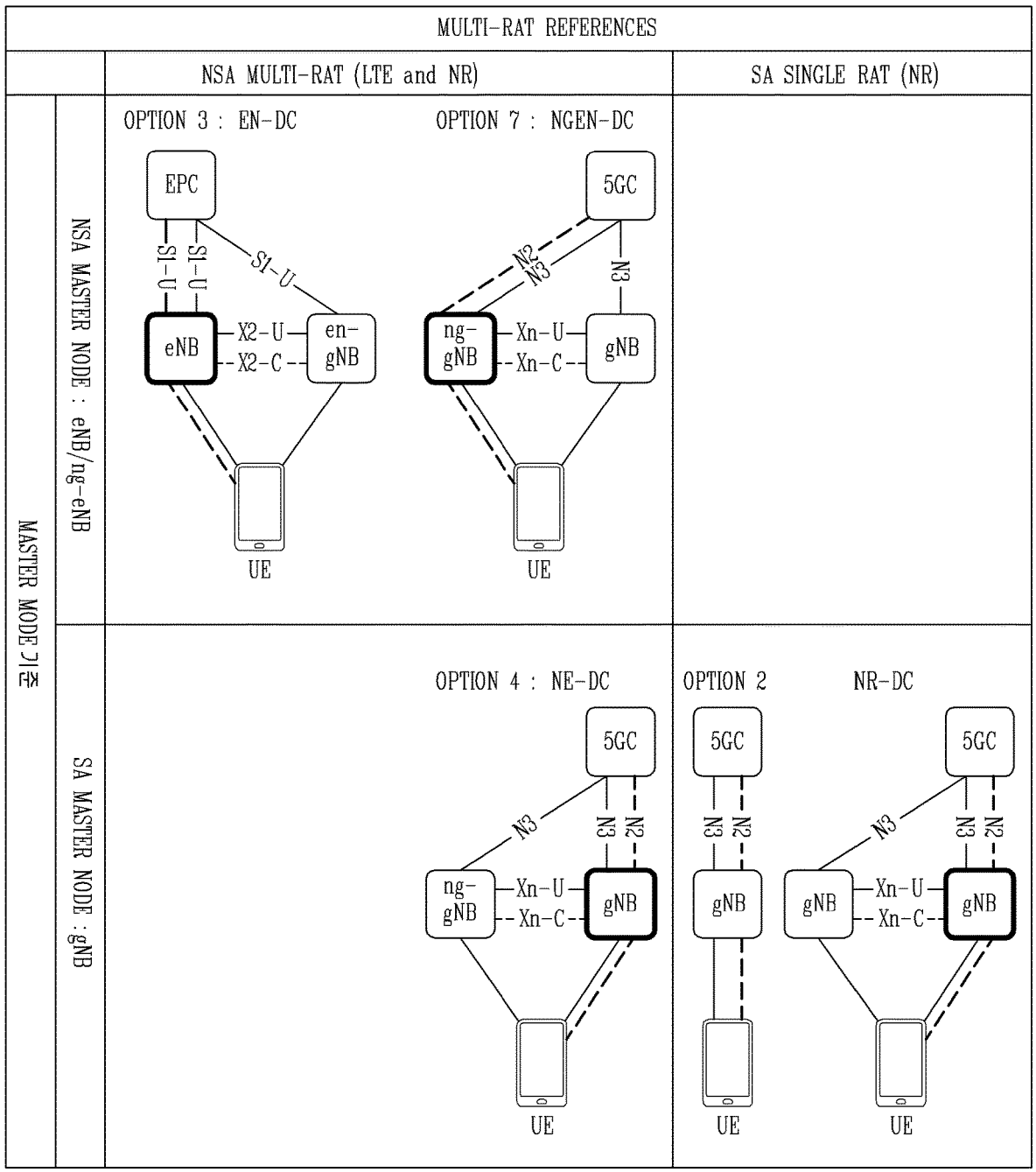
FIG. 9 is a conceptual view illustrating configurations in which an electronic device associated with the present disclosure interfaces with a plurality of base stations or network entities.

Referring to FIG. 9, 4G/5G deployment options are shown. With regard to 4G/5G deployment, when multi-RAT of 4G LTE and 5G NR is supported in a non-standalone (NSA) mode, it may be implemented as EN-DC in option 3 or NGEN-DC in option 5. In addition, when multi-RAT is supported in a standalone (SA) mode, it may be implemented as NE-DC in option 4. In addition, when single RAT is supported in a standalone (SA) mode, it may be implemented as NR-DC in option 2.

With regard to the base station type, the eNB is a 4G base station, which is also called an LTE eNB, and is based on the Rel-8-Rel-14 standard. In addition, ng-eNB is an eNB capable of interworking with a 5GC and gNB, which is also called an eLTE eNB, and is based on the Rel-15 standard. Furthermore, the gNB is a 5G base station interworking with a 5G NR and 5GC, which is also called an NR gNB, and is based on the Rel-15 standard. In addition, the en-gNB is a gNB capable of interworking with an EPC and an eNB, also called an NR gNB, and is based on the Rel-15 standard. With regard to the Dual Connectivity (DC) type, option 3 represents E-UTRA-NR Dual Connectivity (EN-DC). Option 7 represents NG-RAN E-UTRA-NR Dual Connectivity (NGEN-DC). Furthermore, option 4 represents NR-E-UTRA Dual Connectivity (NE-DC). Furthermore, option 2 represents NR-NR Dual Connectivity (NR-DC). Further, the technical features of double connection according to option 2 through option 7 are as follows.

Option 2: Independent 5G services may be provided with only a 5G system (5GC, gNB). In addition to enhanced Mobile Broadband (eMBB), Ultra-Reliable Low-Latency Communication (URLLC) and Massive Machine Type Communication (mMTC) may be possible, and 5GC features such as network slicing, MEC support, mobility on demand, and access-agnostic may be available to provide a full 5G service. Initially, due to coverage limitations, it may be used as a hot spot, an enterprise or overlay network, and when it is out of a 5G NR coverage, EPC-5GC interworking is required. A 5G NR full coverage may be provided, and dual connectivity (NR-DC) may be supported between gNBs using a plurality of 5G frequencies.

Option 3: This is a case where only a gNB is introduced into the existing LTE infrastructure. The core is an EPC and the gNB is an en-gNB that can interwork with the EPC and the eNB. The dual connectivity (EN-DC) is supported between the eNB and the en-gNB, and the master node is an eNB. An eNB, which is a control anchor of an en-gNB, processes control signaling for network access, connection configuration, handover, etc. of a UE, and user traffic may be transmitted through the eNB and/or the en-gNB. It is an option that is mainly applied to a first stage of 5G migration, as an operator operating an LTE nationwide network is able to quickly build a 5G network with the introduction of the en-gNB and minimal LTE upgrade without 5GC.

There are three types of option 3, which are options 3/3a/3x, depending on the user traffic split schemes. Bearer split is applied to options 3/3x, but is not applied to option 3a. The main scheme is option 3x.

Option 3: Only an eNB is connected to an EPC and an en-gNB is connected only to the eNB. User traffic may be split at a master node (eNB) and transmitted simultaneously to LTE and NR.

Option 3a: Both the eNB and the gNB are connected to the EPC, and thus user traffic is directly transferred from the EPC to the gNB. User traffic is transmitted to LTE or NR.

Option 3x: It is a combination of option 3 and option 3a, which differs from Option 3 in that user traffic is split at the secondary node (gNB).

The advantages of option 3 are i) that LTE can be used as a capacity booster for eMBB services, and ii) the terminal is always connected to LTE to provide service continuity through LTE even if it is out of 50 coverage or NR quality deteriorates so as to provide stable communication.

Option 4: 5GC is introduced, and still interworking with LTE, but independent 5G communication is possible. Core is 5GC, and the eNB is an ng-eNB capable of interworking with 5GC and a gNB. Dual connectivity (NE-DC) is supported between an ng-eNB and a gNB, and the master node is the gNB. LTE may be used as a capacity booster when 5G NR coverage is fully extended. There are two types of option 4, which are option 4/4a. The main scheme is option 4a.

Option 7: 5GC is introduced, and still interworking with LTE, and 5G communication relies on LTE. Core is 5GC, and the eNB is an ng-eNB capable of interworking with 5GC and a gNB. Dual connectivity (NGEN-DC) is supported between an ng-eNB and a gNB, and the master node is a gNB. 5GC features may be used, and when 5 coverage is insufficient yet, service continuity may be provided using an eNB as the master node similar to option 3. There are three types of option 7, which are options 7/7a/7x, depending on the user traffic split schemes. Bearer split is applied to options 7/7x, but is not applied to option 7a. The main scheme is option 7x.

Figure 10:
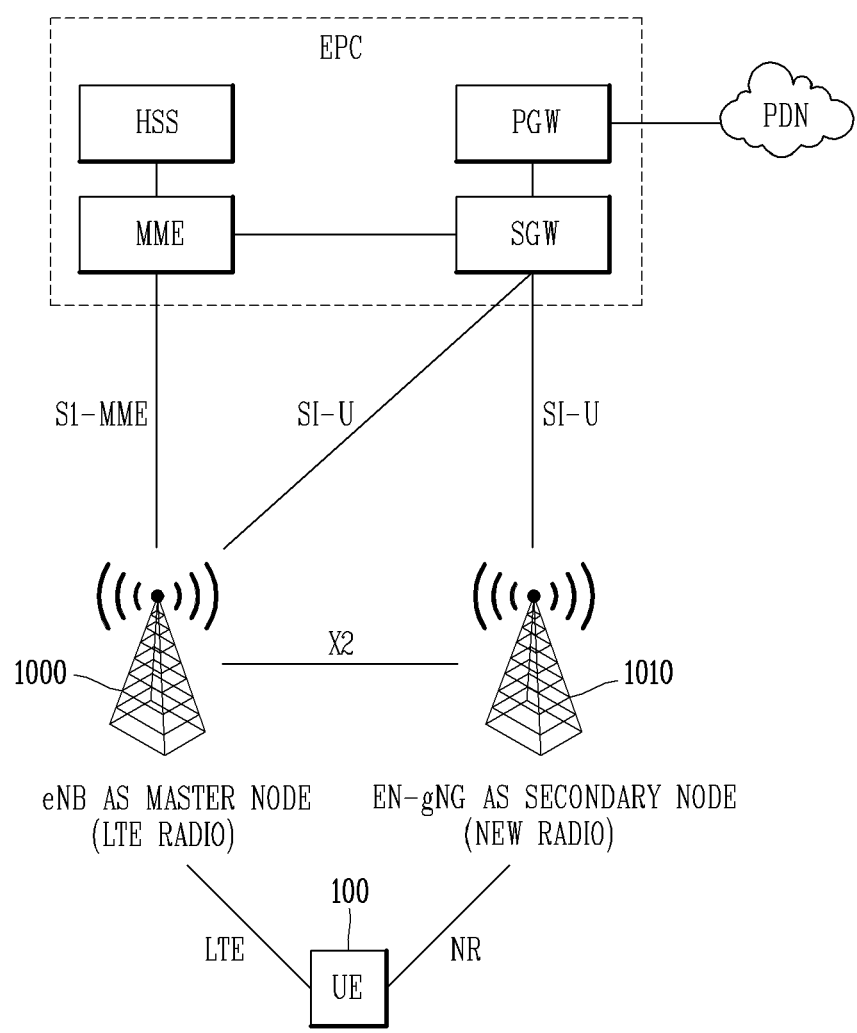
FIG. 10 is a conceptual view illustrating a system structure in which an electronic device associated with the present disclosure is connected to a plurality of different networks according to a NSA (Non Stand Alone) structure.

Meanwhile, according to an NSA structure in association with MRDC (Multi RAT(Radio Access Technology) Dual Connectivity), an electronic device may be simultaneously connected to networks according to a plurality of different communication schemes to receive data from the connected networks. FIG. 10 illustrates an E-UTRA New Radio Dual Connectivity (EN-DC) structure in more detail as such an NSA structure.

Referring to FIG. 10, the electronic device 100 may be simultaneously connected to an eNB 1000 performing a function of a master node and an en-gNB 1010 serving as a secondary node.

Here, the eNB 1000 may generate an S1-MME control connection with MME that is a control entity of an EPC, which is a core of an LTE system. Furthermore, the S1-MME control connection may relay the transmission and reception of NAS control messages between the MME and the electronic device. In addition, the eNB 1000 may generate an RRC connection with the electronic device using LTE Radio technology, and manage an RRC state based on the connection.

Meanwhile, the en-gNB 1010 may not participate in the control connection and NAS message relay associated with the EPC, but may only participate in an additional data connection for transmitting and receiving data above a certain size. In addition, the electronic device 100 may first attach to the EPC through the eNB 1000 for a dual connectivity (DC) connection. Furthermore, PDN (Packet Data Network) connection and bearers may be generated. When the PDN connection and the bearers are generated, the electronic device may be in an RRC connected state with the eNB 1000.

Then, the eNB 1000, which is a master node may determine the DC use of the electronic device in consideration of the current congestion state of the eNB 1000, the data transmission/reception status of the electronic device 100, and the presence of the en-gNB 1010 to act as a secondary node around the eNB 1000, the congestion state of the en-gNB 1010, and the like.

In addition, when the DC use is determined, the eNB 1000 may transmit and receive X2-C control messages to and from the en-gNB 1010 through an X2 interface. Furthermore, through the exchange of control messages, the eNB 1000 may execute a procedure of allowing part of bearers for serving data transmission and reception to the electronic device 100 to be served through the en-gNB 1010 using LTE radio resources controlled by the eNB 1000.

Therefore, part of bearers for serving data transmission and reception to the electronic device 100 may be transferred to the en-gNB 1010 using LTE radio resources, and the electronic device 100 may transmit and receive data using NR radio resources controlled by the en-gNB 1010 through the transferred part of bearers. Accordingly, the electronic device may be connected to both the eNB 1000 and the en-gNB 1010 to transmit and receive data through both LTE, that is, 4G radio resources and NR, that is, 5G radio resources.

Figure 11:
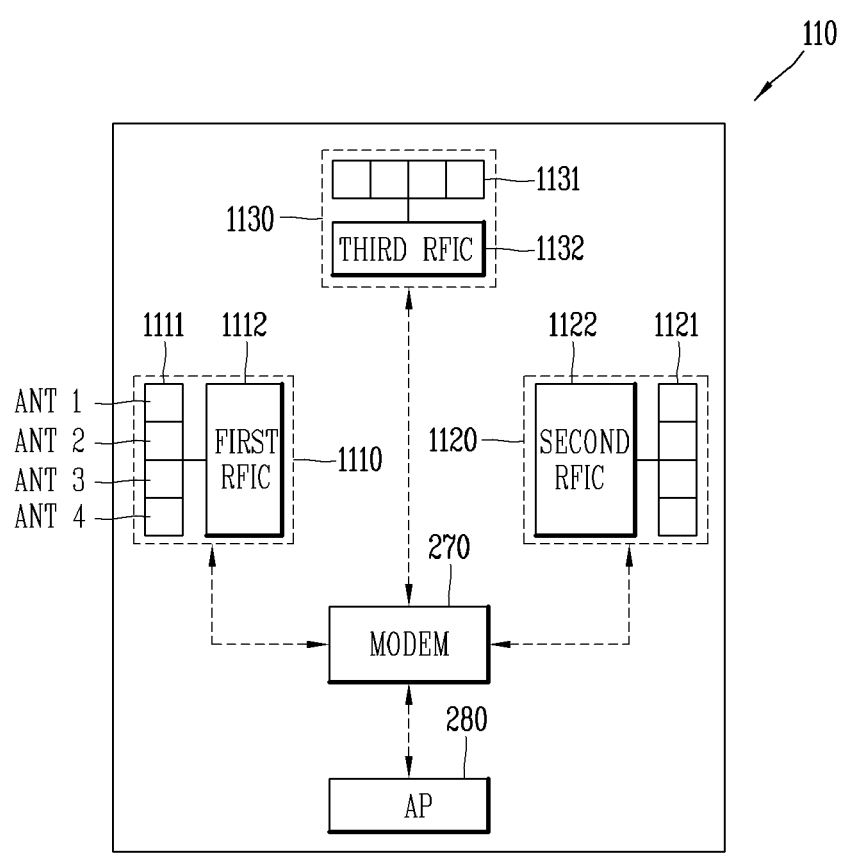
FIG. 11 is an exemplary view illustrating an example of a structure in which a plurality of antenna modules are arranged in an electronic device associated with the present disclosure.

FIG. 11 is an exemplary view illustrating an example of a structure in which a plurality of antenna modules are arranged in an electronic device associated with the present disclosure.

Referring to FIG. 11, FIG. 11 is a block diagram illustrating a structure of the wireless communication module 110 disposed with a plurality of modules (hereinafter, mmWave modules) for performing wireless communication using mmWave.

Referring to FIG. 11, the wireless communication module 110 includes a plurality of antenna modules 1110, 1120, 1130 performing broadband high-speed wireless communication through millimeter waves (mmWaves) (hereinafter, mmWave antenna modules such as a first antenna module, a second antenna module and a third antenna module).

The first to third antenna modules 1110, 1120, 1130 can perform wireless communication using frequencies in a millimeter wave (mmWave) band. In this instance, the first to third antenna modules 1110, 1120, 1130 have a bandwidth greater than that using frequencies in a sub-6 band to perform higher speed wireless communication. In addition, the mmWave antenna modules 1110, 1120, 1130 can perform beam forming to extend communication coverage, and include an antenna array 1111, 1121, and 1131, having a plurality of antennas, respectively. In addition, the first to third antenna modules 1110, 1120, 1130 include RFICs 1112, 1122, 1132, respectively, designed for millimeter wave (mmWave) communication, and each RFIC is connected to and controlled by a modem.

Further, the first to third antenna modules 1110, 1120, 1130 may each include a temperature sensor. Each temperature sensor may be provided in each RFIC or in each antenna array. Preferably, the temperature sensor is provided in a power amplifier (PA), which generates the most heat as a high voltage is applied. Furthermore, a temperature value detected by each temperature sensor can be transmitted to the modem 270 as a temperature value of each antenna module.

In addition, as shown in FIG. 11, the first antenna module 1110 to the third antenna module 1130 can be arranged at different positions in the electronic device 100. Accordingly, the shape of a space disposed with the first antenna module 1110, the shape of a space disposed with the second antenna module 1120, and the shape of a space disposed with the third antenna module 1130 can be different from one another. In addition, the heating characteristics of the first antenna module 1110 to the third antenna module 1130 can be different from one another according to a difference in the arrangement positions or a shape of a case disposed with each antenna module.

For example, the first antenna module 1110, the second antenna module 1120, and the third antenna module 1130 may each include at least one heat dissipation member for mitigating heat stress. However, at least one button for receiving an input from a user may be disposed around one of the first antenna module 1110, the second antenna module 1120, and the third antenna module 1130. In this instance, due to a space for the button to be drawn in, and a space for the arrangement of a circuit corresponding to the button, a heat dissipation member included in any one of the antenna modules may be further reduce or a heat dissipation member having a smaller size or a smaller thickness may be included therein. In this instance, the heat dissipation characteristics of the first antenna module 201, the second antenna module 202, and the third antenna module 1130 may be different from one another depending on the number or area of the heat dissipation member, and a structure connected to the heat dissipation member.

In addition, heat dissipation characteristics of the first antenna module 1110, the second antenna module 1120, and the third antenna module 1130 may vary from one another depending on other components adjacent thereto. For example, for an antenna module in which a CPU, for example, an AR which may have a high temperature during the use of the electronic device 100, is disposed therearound, heat generation amount may be higher than that of an antenna module that is not disposed therearound.

Furthermore, the heat dissipation characteristics of the first antenna module 1110, the second antenna module 1120, and the third antenna module 1130 may vary from one another depending on the material of the heat dissipation member or the material of a member adjacent to the antenna module. For example, w % ben a member with a material having a high thermal diffusion index is adjacent to the periphery of the antenna module, heat of the antenna module may be diffused more quickly through the adjacent member. On the contrary, in case where a member with a material having a low thermal diffusion index is adjacent to the periphery of the antenna module, a speed of heat diffusion through the adjacent member is slow, and therefore, heat generation amount may be increased even when driven for the same period of time as compared to a case where a member having a high thermal diffusion index is adjacent thereto.

In other words, even though an antenna module performs wireless communication in the same manner (for example, wireless communication in a mmWave frequency band), the antenna module may have different heat dissipation characteristics due to the characteristics of adjacent members or the structural characteristics of a space disposed with the antenna module. In addition, the heat dissipation characteristic may determine a rate at which the temperature of the antenna module rises when wireless communication is made under the same condition for the same period of time. In other words, an antenna module having an excellent heat dissipation characteristic, that is, an antenna module having a higher heat dissipation characteristic than other antenna modules may have a lower rate of temperature rise compared to other antenna modules (antenna modules having lower heat dissipation characteristics than other antenna modules) when radio communication is performed under the same conditions for the same period of time.

In addition, the wireless communication module 110 may include at least one module that performs wireless communication with a base station in a different manner from the first antenna module 1110, the second antenna module 1120, and a third antenna. For example, the wireless communication module 110 may further include a 5G antenna module performing wireless communication according to a 5G communication scheme using frequencies in a sub-6 band or a 4G antenna module performing wireless communication according to a 4G communication scheme. Alternatively, the wireless communication module 110 may further include an antenna module operable in both the 4G wireless communication scheme or the 5G wireless communication scheme using frequencies in a sub-6 band.

In addition, the application processor (AP) 280 is configured to control the operation of each component of the electronic device 100. Specifically, the application processor (AP) 280 can control the operation of each component of the electronic device through the modem 270. Also, FIG. 11 illustrates three antenna modules performing mmWave wireless communication. However, the electronic device may include more or fewer antenna modules.

Figure 12:
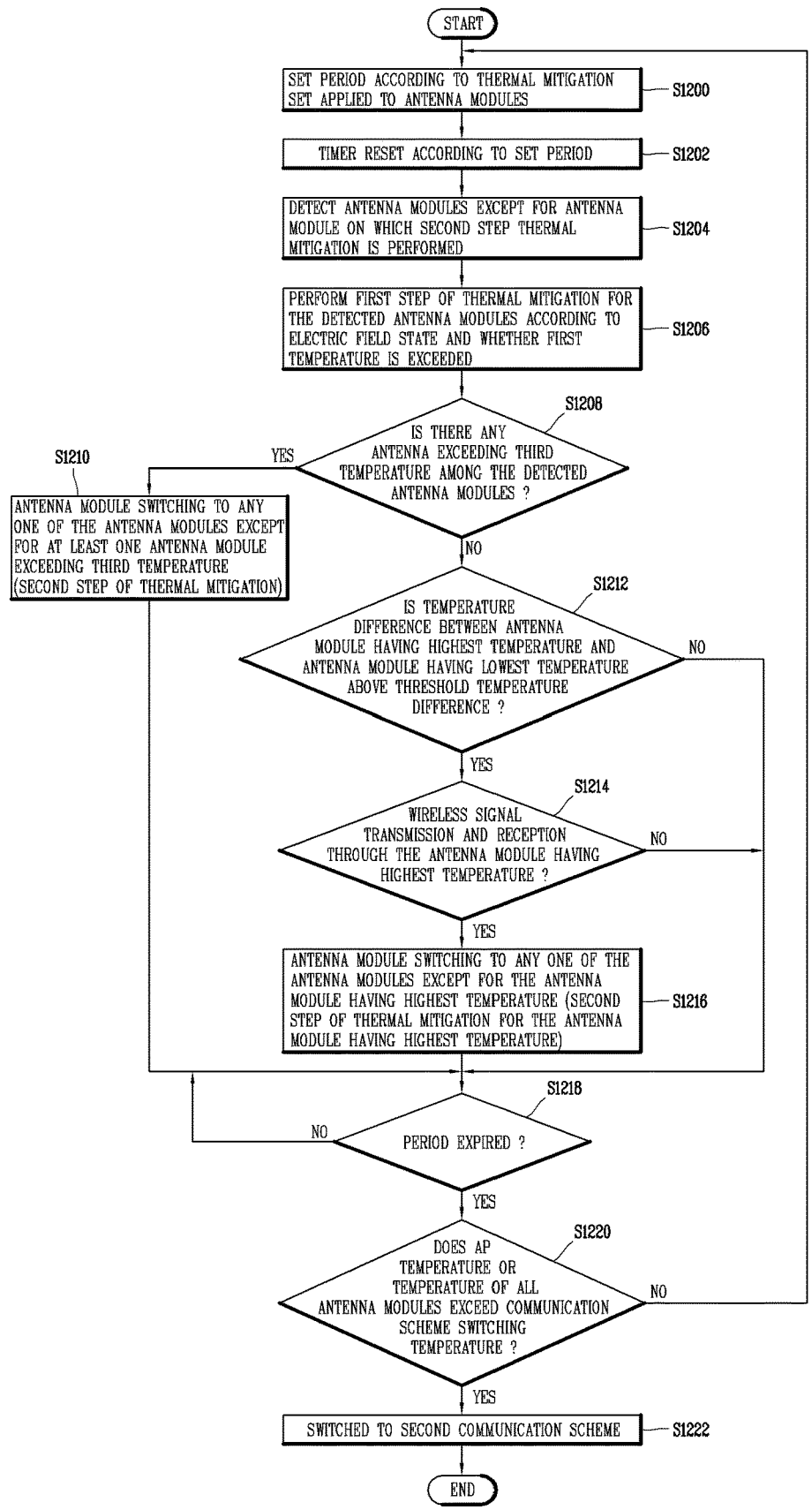
FIG. 12 is a flowchart illustrating an operation process of performing thermal mitigation according to a temperature difference detected between an electronic device surface and an antenna module in an electronic device associated with the present disclosure.

Next, FIG. 12 is a flowchart illustrating an operation process of performing thermal mitigation according to a temperature difference detected between an electronic device surface and an antenna module in the electronic device 100 associated with the present disclosure. First, when the modem of the electronic device 100 performs wireless communication with a base station according to a preset first communication scheme, the temperature of each antenna module is periodically detected to determine a surface temperature of the electronic device 100. In addition, an appropriate thermal mitigation operation is performed according to the detected temperature. Here, the surface temperature of the electronic device 100 may be a temperature of the AP 280 or a temperature detected from a circuit board mounted with the AP 280 and respective antenna modules. In addition, the first communication scheme may be a communication scheme of transmitting and receiving wireless signals to and from a base station using millimeter waves (mmWaves). In the following description, it is assumed that the surface temperature of the electronic device 100 is the temperature of the AP 280 for convenience of description.

Referring to FIG. 12, the modem 270 of the electronic device 100 first detects thermal mitigation steps according to a thermal mitigation operation previously performed on each antenna module. Furthermore, a period of detecting the temperatures of the respective antenna modules and the AP temperature can be determined based on the detected thermal mitigation steps (S1200).

For example, the thermal mitigation steps can be largely divided into 4 steps from 0 to 3 steps. Referring to this, first, a 0-th step may be a state in which the thermal mitigation operation is not performed, that is a step in which the antenna module operates normally without limitation. Here, a state in which the antenna module is normally driven can denote a state in which all antennas in an antenna array provided in the antenna module are activated.

In addition, a first step can be a step of deactivating at least one of the plurality of antennas (antenna array) provided in the antenna module to reduce power applied to the antenna module. Meanwhile, the second step can be a step of switching an antenna module to another antenna module. In this instance, the another antenna module can be an antenna module that performs wireless communication with a base station in the same manner as the first antenna module (for example, wireless communication in a mmWave frequency band). For example, it may be the second antenna module 1120 or the third antenna module 1130. In this instance, when the antenna module is switched from the first antenna module 1110 to the second antenna module 1120, the modem 270 can perform wireless communication with the base station through the second antenna module 1120, and the first antenna module 1110 can be deactivated (e.g., switched to a low power mode) and cooled while wireless communication is performed through the second antenna module 1120.

Furthermore, the third step may be a step of switching the communication scheme to another communication scheme other than the first communication scheme. In this instance, since wireless signals are transmitted and received by a communication scheme other than the first communication scheme, all of the first antenna module 1110 to the third antenna module 1130 can be cooled.

In this instance, the third thermal mitigation step is applied to all the antenna modules, and the thermal mitigation step that can be performed differently for each antenna module may be the first step or the second step. Therefore, the modem 270 can detect the activation state of each antenna module (whether or not the second thermal mitigation step is performed), and whether or not part of the antenna modules are deactivated (whether or not the first thermal mitigation step is performed), and detect the thermal mitigation steps made for each antenna module during communication according to the first communication scheme.

In addition, when the thermal mitigation steps are detected, the modem 270 can differently determine a period for detecting the temperatures according to the detected thermal mitigation steps. For example, when there is an antenna module on which the second thermal mitigation step is performed, the modem 270 can determine a preset period as it is. In addition, when there is an antenna module on which the second thermal mitigation step is performed, a period shorter than the preset period can be determined as the temperature detection period. For example, when there is an antenna module on which the second thermal mitigation step is performed, the modem 270 can determine a time corresponding to half of the preset period as the temperature detection period.

When the temperature detection period is determined in step S1200, the modem 270 can execute a timer set according to the determined temperature detection period (S1202). In addition, the modem 270 can detect antenna modules among the respective antenna modules except for the antenna module on which the second thermal mitigation step is performed (S1204). In this instance, except for the antenna module deactivated according to the execution of the second thermal mitigation step, modules on which the thermal mitigation step is not performed, and antenna modules on which some antennas are deactivated according to the first thermal mitigation step can be detected.

When at least one antenna module is detected in the step S1204, the modem 270 can perform a first step of thermal mitigation on at least one antenna module based on the detected temperature of each antenna module (S1206). For example, the modem 270 can measure the temperatures of each antenna module detected in the step S1204. Furthermore, when there is an antenna module having a temperature exceeding a preset first temperature for the first step of thermal mitigation, an operation for thermal mitigation according to the first step can be performed with respect to the corresponding antenna module. Accordingly, for the antenna module having a temperature exceeding the first temperature, part of the activated antennas can be deactivated. In this case, if one antenna module is activated in the antenna module, only the one antenna may remain in an activated state.

In addition, the step S1206 may be a step of detecting an electric field state between the electronic device 100 and the base station and performing a first step of thermal mitigation on at least one antenna module detected in the step S1204 according to the detected electric field state. For millimeter waves, due to the straightness of the high-frequency signals, it is highly likely to be in a strong electric field state when millimeter wave communication is performed, thereby allowing efficient communication with the base station even when the number of antennas used is reduced when the electric field is strong. Therefore, it is possible to suppress the heat generation of the antenna module by reducing the number of antennas when the electric field is excellent regardless of the temperature condition.

In addition, the detection of the electric field is performed according to at least one of various determination schemes capable of determining the quality of received signals such as RSRP (Reference Signal Received Power) or BER (Bit Error Rate) detected from signals according to the first communication scheme.

In the above description, the step S1206 has been described as a first step of thermal mitigation for the at least one antenna module detected in the step S1204 according to any one of the detected antenna module temperature or the detected electric field state, but the temperature of the antenna module or the electric field state and both of them can be detected to perform the first step of thermal mitigation for at least one antenna module detected in the step S1204 according to at least one of the detected temperature of the antenna module and the electric field state.

In addition, in the step S1206, when a first step of thermal mitigation operation for at least one antenna module is performed, the modem 270 can detect whether there is an antenna module exceeding a preset temperature (hereinafter, referred to as a third temperature) among the antenna modules detected in the step S1204 (S1208). Here, the third temperature may be a temperature higher than the first temperature. For example, the third temperature may be a preset second temperature for a second step of thermal mitigation. Alternatively, the third temperature may be a temperature equal to a preset temperature for a third step of thermal mitigation in which the communication scheme is switched to another communication scheme.

As a result of the detection in the step S1208, when there is at least one antenna module whose temperature exceeding the third temperature is detected among the antenna modules detected in the step S1204, the modem 270 can perform a second step of thermal mitigation for the at least one antenna module exceeding the third temperature. In other words, the modem 270 can deactivate at least one antenna module exceeding the third temperature, and switch the antenna module to any one of the other antenna modules except for the at least one antenna module exceeding the third temperature (S1210). In this instance, w % ben a specific antenna module exceeds the third temperature due to the use of the specific antenna module, the antenna module can be switched to another antenna module except for the specific antenna module. Furthermore, the cooling of the specific antenna module can be initiated by inactivation according to the second step of thermal mitigation.

In the step S1210, when the second step of thermal mitigation for the antenna module exceeding the third temperature is performed, the modem 270 can detect whether the temperature detection period set in the step S1200 has expired (S1218). In addition, if there is no antenna module exceeding the third temperature among the currently activated antenna modules (antenna modules detected in the step S1204) as a result of the detection in the step S1208, the modem 270 can detect a temperature between the antenna module having the highest detected temperature and the antenna module having the lowest detected temperature among the antenna modules. In addition, the modem 270 can detect whether the detected temperature exceeds a surface temperature of the electronic device 100, that is, a threshold temperature difference determined from the temperature of the AP 280 or a circuit board mounted with the AP 280 (S1212).

Here, the threshold temperature difference can be determined differently according to the surface temperature of the electronic device. For example, as shown in Table 3 below, the threshold temperature difference can be set to a smaller value as the surface temperature of the electronic device 100 increases.

TABLE 3

| Surface temperature | Normal (below 37 degrees) | Above 37 degrees- below 41 degrees | Above 41 degrees |
| --- | --- | --- | --- |
| Threshold temperature difference | 5 degrees | 3 degrees | 2 degrees |

Therefore, the modem 270 can determine the surface temperature based on the currently detected temperature of the AP or the circuit board in the step S1212, and set a threshold temperature difference according to the determined surface temperature. Furthermore, the modem 270 can compare a temperature difference between an antenna module having the highest detected temperature and an antenna module having the lowest detected temperature and a threshold temperature difference set according to the surface temperature to determine whether the temperature difference between the antenna modules is greater than or equal to the threshold temperature difference.

As a result of the determination in the step S1212, when the temperature difference between the antenna modules is less than the threshold temperature difference, the modem 270 can currently maintain a state in which thermal mitigation is performed for each antenna module. Therefore, when the first step of thermal mitigation is performed on at least one antenna module in the step S1206, a state in which the first step of thermal mitigation is performed on the at least one antenna module can be maintained. In addition, the modem 270 can proceed to the step S1218 to detect whether the temperature detection period set in the step S1200 has expired.

In addition, when it is determined in the step S1212 that a temperature difference between the antenna modules is greater than or equal to the threshold temperature difference, the modem 270 can determine whether the antenna module having the highest temperature is an antenna module that is currently performing wireless communication with the base station (S1214). Furthermore, when the antenna module is not currently performing wireless communication with the base station, in a state in which thermal mitigation is currently performed for each antenna module, the modem 270 can proceed to the step S1218 to detect whether a temperature detection period set in the step S1200 has expired.

In addition, as a result of the determination in the step S1214, when the antenna module having the highest temperature is an antenna module currently performing wireless communication with the base station, the modem 270 can perform the second step of thermal mitigation for the antenna module having the highest temperature. In other words, the modem 270 can deactivate the antenna module having the highest temperature, and switch the antenna module to any one of the other antenna modules except for the antenna module having the highest temperature (S1216). Therefore, according to the present disclosure, switching for the antenna module having the highest temperature can be performed according to a temperature difference between the antenna modules to the surface temperature of the electronic device 100 even when the antenna module does not reach a preset temperature (second temperature) for the second step of thermal mitigation. In other words, according to the present disclosure, the second step of thermal mitigation for the antenna module having the highest temperature can be performed according to a temperature difference between the antenna modules with respect to the surface temperature of the electronic device 100 regardless of the temperature of the specific antenna module, thereby more quickly and more efficiently cooling the antenna module having a higher temperature.

In addition, as a result of detecting whether the temperature detection period has expired in step S1218, the modem 270 can determine whether the detected AP temperature and the temperatures of all the antenna modules respectively exceed preset communication scheme switching temperatures when the currently set temperature detection period has expired (S1220). Furthermore, as a result of the determination in step S1220, when at least one of the detected AP temperature and the temperatures of the antenna modules is respectively less than the communication scheme switching temperature, the modem 270 can process the step S1200 again to perform the foregoing process of FIG. 12 again.

On the contrary, as a result of the determination in step S1220, when the detected AP temperature and the temperatures of the antenna modules are equal to or higher than the communication scheme switching temperature, the modem 270 can switch the communication scheme to a second communication scheme (S1222). In this instance, the modem 270 can perform wireless communication with the base station through a scheme different from the first communication scheme through other antenna modules except for the first antenna module 1110 to the third antenna module 1130. For example, when the first communication scheme is a communication scheme using frequencies in a millimeter wave (mmWave) band, the second communication scheme may be a communication scheme (NR: New Radio) or 4G communication scheme using frequencies in a sub-6 band.

In addition, the electronic device 100 according to an embodiment of the present disclosure, through the steps S1212 to S1214 in FIG. 12, when the temperature of an antenna module currently transmitting and receiving wireless signals to and from the base station is the highest, can determine whether the antenna for transmitting and receiving wireless signals is significantly higher than other antenna modules based on the threshold temperature difference. In addition, through the step S1216 in FIG. 12, the antenna module having the highest temperature, that is, the antenna module for currently transmitting and receiving wireless signals with the base station, can be switched to another antenna module.

Here, the electronic device 100 according to an embodiment of the present disclosure can switch the antenna module having the highest temperature to the antenna module having the lowest temperature. In this instance, the modem 270 can determine whether the next higher antenna module among the remaining antenna modules except for the highest antenna module satisfies a preset condition, and exclude antenna modules satisfying the preset condition from switchable antenna modules (hereinafter, referred to as antenna modules subject to switching) when the preset condition is satisfied.

In addition, the preset condition can be determined according to a temperature difference between the preset temperature and the antenna module having the lowest temperature. In other words, the modem 270 can exclude an antenna module on which the temperature exceeds a predetermined level and a temperature difference with the antenna module having the lowest temperature is above a predetermined level (e.g., a threshold temperature difference) among the remaining modules except for the antenna module having the highest temperature from antenna modules subject to switching together with the antenna module having the highest temperature. Then, the modem 270 can perform antenna module switching to any one of the antenna module having the highest temperature and antenna modules other than at least one antenna module satisfying the preset condition. In other words, the modem 270 can perform the second step of thermal mitigation simultaneously on both the antenna module having the highest temperature and at least one antenna module satisfying the preset condition.

Figure 13:
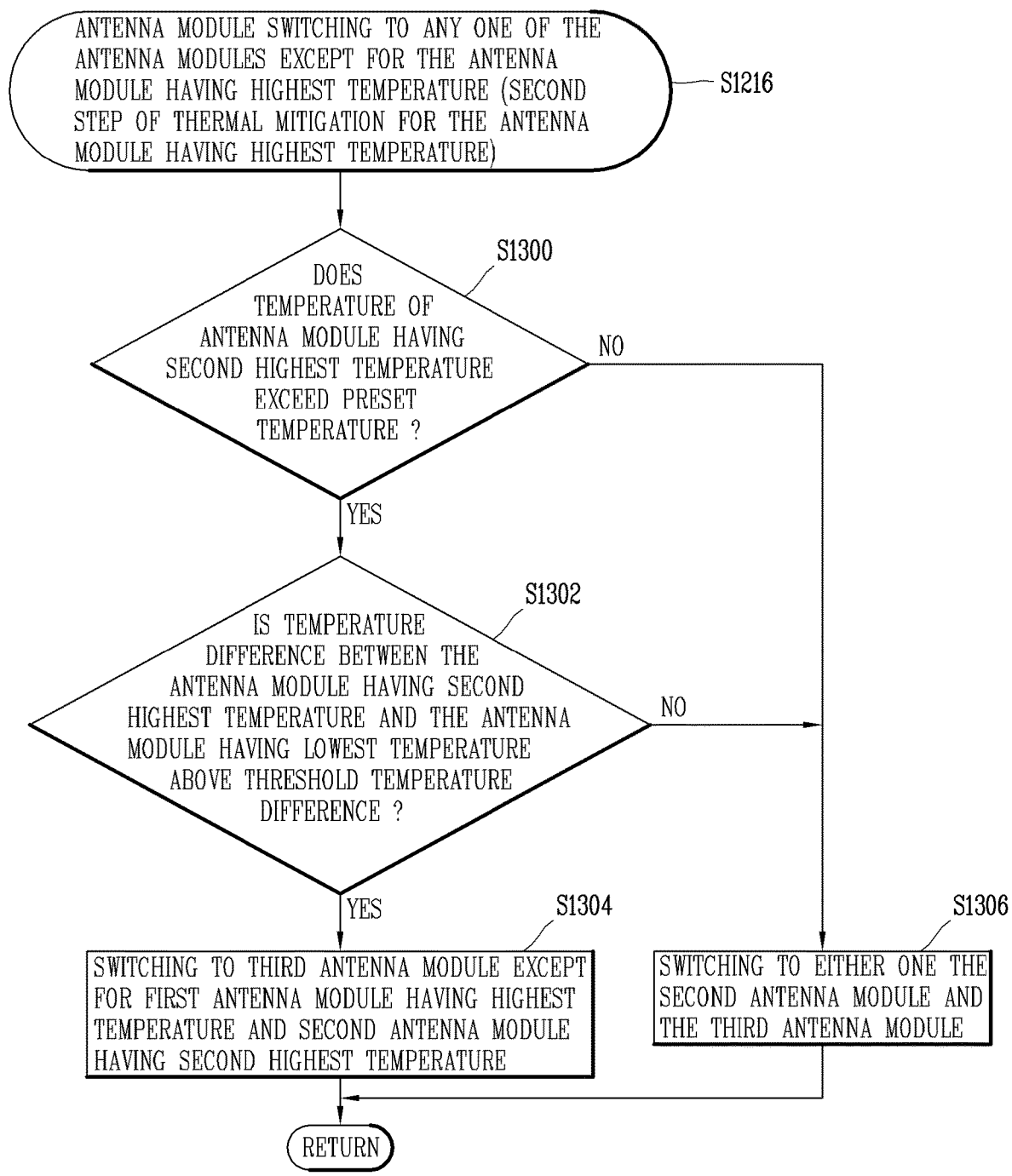
FIG. 13 is a flowchart illustrating an operation process of switching to a specific antenna module according to a temperature difference between antenna modules in an electronic device associated with the present disclosure.

Next, FIG. 13 is a flowchart illustrating an operation process of switching to a specific antenna module according to a temperature difference between antenna modules in an electronic device associated with the present disclosure. For convenience of description, in the description of FIG. 13, it is assumed that the electronic device 100 includes three antenna modules. Furthermore, an antenna module having the highest temperature is assumed to be a first antenna module, and an antenna module having the next highest temperature is assumed to be a second antenna module, and an antenna module having the lowest temperature is assumed to be a third antenna module.

Referring to FIG. 13, in the steps of S1212 and S1214 in FIG. 12, when a temperature difference between the antenna module having the highest temperature (first antenna module) and the antenna module having the lowest temperature (third antenna module) is greater than or equal to a threshold temperature difference in a state where the first antenna module performs wireless communication with the base station, the modem 270 of the electronic device 100 associated with the present disclosure can detect whether the temperature of the antenna module having the second highest temperature (second antenna module) exceeds a preset temperature (S1300).

Furthermore, when the second antenna module does not exceed the preset temperature as a result of the detection of step S130), the modem 270 can determine that the preset condition is not satisfied, and change the antenna module performing wireless communication with the base station through switching to either one of the second antenna module and the third antenna module (S1306). In other words, the second step of thermal mitigation can be performed for only one first antenna module. Then, the first antenna module can be deactivated, and thus the resultant cooling can be performed.

In addition, as a result of the detection in step S1300, when the second antenna module exceeds a preset temperature, the modem 270 can detect a temperature difference between the second antenna module and the third antenna module. Furthermore, the modem 270 can detect whether the detected temperature difference is above a threshold temperature difference determined according to the current surface temperature of the electronic device 100, that is, the AP temperature or the temperature of the circuit board (S1302). Furthermore, as a result of the detection in step S1302, when a temperature difference between the second antenna module and the third antenna module is less than the threshold temperature difference, the modem 270 can determine that the preset condition is not satisfied, and proceed to step S1306 to change the antenna module performing wireless communication with the base station through switching to either one of the second antenna module and the third antenna module.

However, as a result of the detection in step S1302, when the temperature difference between the second antenna module and the third antenna module is above the threshold temperature difference, the modem 270 can determine that the second antenna module satisfies the preset condition. Then, the modem 270 can perform the second step of heat mitigation for both the first antenna module having the highest temperature and the second antenna module satisfying the preset condition (S1304). Accordingly, among the first to third antenna modules, the first antenna module and the second antenna module can be excluded from switchable antenna modules (antenna modules subject to switching). As a result, antenna module switching can be performed only for the remaining one antenna module, that is, the third antenna module having the lowest temperature. In this instance, the first antenna module and the second antenna module can be deactivated at the same time, and cooling according to the deactivation can be performed.

In addition, when a deactivated antenna module is generated through the second step of thermal mitigation, and when the antenna module is cooled according to the deactivation, the modem module 270 of the electronic device 100 can change the thermal mitigation step applied according to the cooled temperature of the antenna module.

For example, when the antenna module is turned off through deactivation, the modem 270 can turn on the antenna module according to the cooled temperature of the antenna module, and apply power for driving a low power mode. Furthermore, according to the cooled temperature, at least part of the plurality of antennas provided in the antenna module can be connected to the RFIC. Alternatively, when the antenna module is driven in a low power mode through deactivation, the modem 270 can control the antenna module to allow at least one antenna to be connected to the RFIC according to the cooled temperature of the antenna module.

In this instance, when the cooled temperature of the antenna module is lower than a preset first temperature for the first step of thermal mitigation, all of the plurality of antennas can be connected to the RFIC. In other words, the antennas may be changed to a state corresponding to a state (normal state) in which thermal mitigation is not performed.

Alternatively, when the cooled temperature of the antenna module exceeds the first temperature to be lower than a preset second temperature for the second step of thermal mitigation, part of the antennas can be connected to the RFIC. In other words, it may be changed to a state corresponding to a state in which the first step thermal mitigation is performed.

Figure 14:
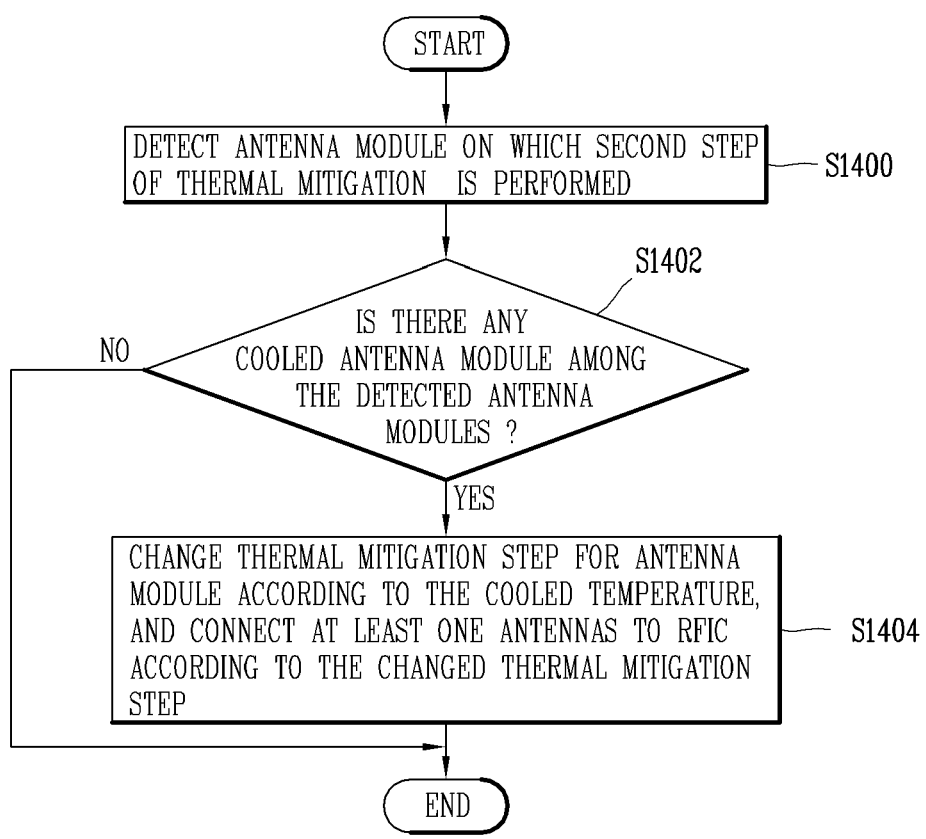
FIG. 14 is a flowchart illustrating an operation process of changing a thermal mitigation step according to a temperature of an antenna module in an electronic device associated with the present disclosure.

Next, FIG. 14 is a flowchart illustrating an operation process of changing a thermal mitigation step applied to the relevant antenna module according to the cooled temperature of the antenna module in an electronic device associated with the present disclosure. Referring to FIG. 14, first, the modem 270 of the electronic device 100 can detect at least one antenna module in which the second step of thermal mitigation is performed (S1400). Furthermore, when at least one antenna module is detected, the method detects whether there is an antenna module whose temperature is cooled among the detected antenna modules (S1402).

As a result of the detection in the step S1402, when there is a cooled antenna module, the modem 270 can change the thermal mitigation step applied to the relevant antenna module according to the cooled temperature of the antenna module (S1404). For example, the modem 270 can switch the antenna module turned off according to the execution of the second step of thermal mitigation to an on state, and connect at least part of the antennas to the RFIC of the relevant antenna module. Alternatively, the modem 270 can drive at least part of the antennas in a state in which all of the plurality of antennas provided in the relevant antenna module are deactivated according to the operation of the low power mode.

Here, the number of antennas connected or activated to the RFIC may vary depending on the cooled temperature of the relevant antenna module. For example, when the temperature of the relevant antenna module is lower than a preset first temperature for the first step of thermal mitigation, all of the plurality of antennas provided in the relevant antenna module may be connected to the RFIC or may be activated. However, when the temperature of the relevant antenna module is higher than the first temperature and lower than a preset second temperature for the second step of thermal mitigation, only part of the plurality of antennas provided in the relevant antenna module may be connected to the RFIC or may be activated.

In addition, the modem 270 can perform the process described with reference to FIG. 14 at preset periods separately from the processes shown in FIG. 12. Accordingly, when antenna module switching is generated through step S1210 or step S1216 in FIG. 12, at least one antenna module can be detected in the step S1400, and when there is any detected antenna module, the state of the relevant antenna module can be switched from a state in which the second step of thermal mitigation is performed (deactivated) to a state in which the first step of thermal mitigation is performed (only part of the antennas are connected to the RFIC), or a state in which the 0-th step of thermal mitigation is performed (all of the antennas are connected to the RFIC).

Further, FIG. 14 illustrates an example where the antenna module in which the second step of thermal mitigation is performed in step S1400 is detected, but all antenna modules in which the first of further step of thermal mitigation has been performed may be detected. In this instance, the modem 270 can also detect the antenna modules on which the first step of thermal mitigation is performed in step S1400, and the antenna modules on which the first step of thermal mitigation is performed through steps S1402 and S1404 can also be switched to a state in which the 0-th step of thermal mitigation is performed according to the detected temperature. When the communication scheme is changed from a first communication scheme to a second communication scheme, the electronic device 100 can be switched back to the first communication scheme according to whether a preset temperature condition is satisfied.

Figure 15:
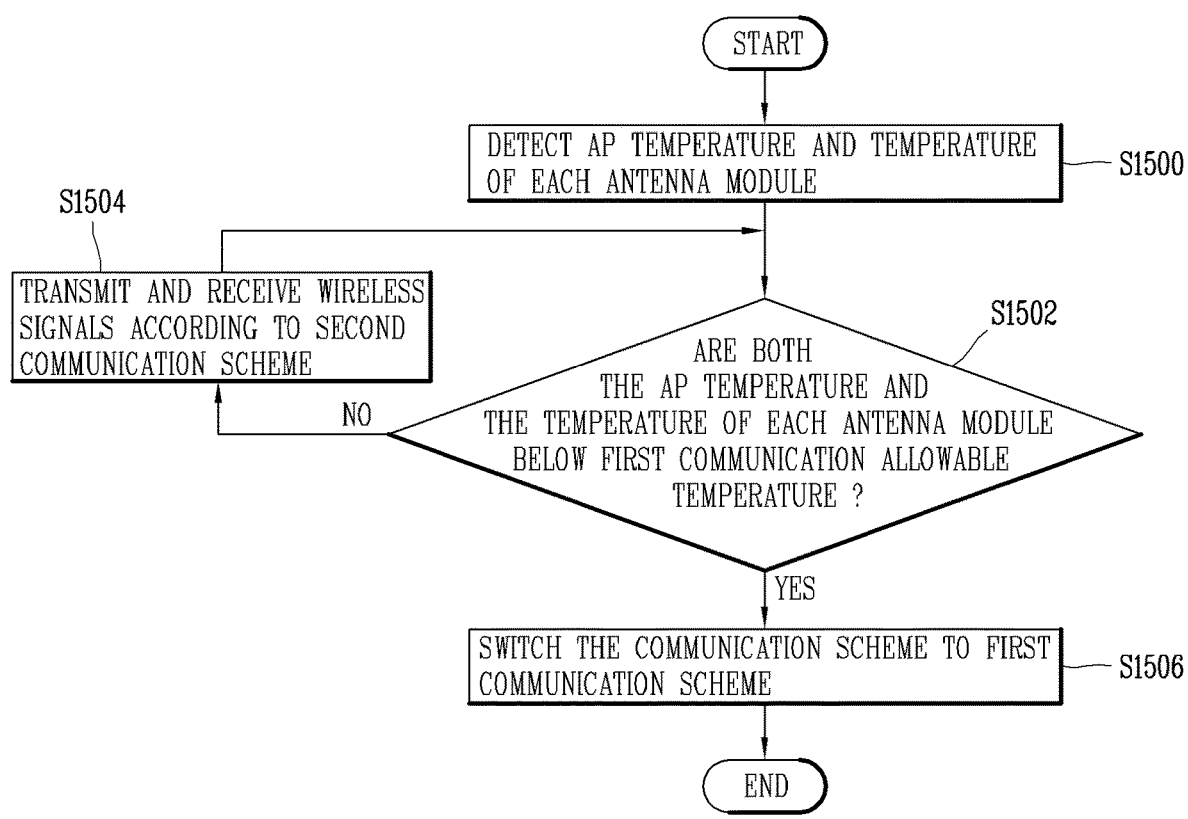
FIG. 15 is a flowchart illustrating an operation process of switching the communication scheme back to a first communication scheme according to the temperature of the antenna module and the surface temperature when the communication scheme is switched to a second communication scheme in an electronic device associated with the present disclosure.

Next, FIG. 15 is a flowchart illustrating an operation process of switching the communication scheme back to a first communication scheme according to the temperature of the antenna module and the surface temperature when the communication scheme is switched to a second communication scheme as described above in an electronic device associated with the present disclosure.

Referring to FIG. 15, when switched to the second communication scheme, the modem 270 of the electronic device 100 can determine a surface temperature of the electronic device 100. Furthermore, the temperature of each antenna module can be detected (S1500). Here, the surface temperature of the electronic device 100 can be determined according to the temperature of the AP 280 or the temperature of a circuit board provided with the AP 280, the modem 270, and the plurality of antenna modules. Therefore, it will be described on the assumption that the surface temperature of the electronic device 100 is the AP temperature.

Furthermore, the modem 270 can detect whether the detected AP temperature and the temperatures of each antenna module are all less than or equal to a preset first communication allowable temperature. Here, the first communication scheme may be a communication scheme using frequencies in a millimeter wave (mmWave) band. Therefore, the first communication allowable temperature can denote a temperature at which communication using frequencies in a millimeter wave (mmWave) band is allowed.

Also, the first communication allowable temperature can be set differently according to an object. In other words, the AP allowable temperature corresponding to the AP temperature, and the antenna module allowable temperature corresponding to each antenna module may be different from each other.

For example, the first communication allowable temperature may be a temperature at which the electronic device 100 normally performs wireless communication according to the first communication scheme. Therefore, the AP allowable temperature is a temperature at which the electronic device 100 can normally perform wireless communication according to a first communication scheme, and in Table 3, for example, the AP allowable temperature may be a temperature of 37 degrees or less.

In addition, the antenna module allowable temperature may be a temperature at which each antenna module operates normally, that is, a temperature at which no thermal mitigation is performed. Accordingly, the antenna module allowable temperature may be a temperature lower than a preset first temperature to perform the first step of thermal mitigation.

In this instance, the modem 270 can compare a currently detected AP temperature with a preset AP allowable temperature, and compare temperatures detected on each antenna module with a preset antenna module allowable temperature in the step S1502. As a result of the comparison, when the detected AP temperature is lower than the AP allowable temperature and all of the temperatures detected on each antenna module are lower than the antenna module allowable temperature, it is determined that a condition for switching back to the first communication scheme is achieved.

Therefore, when it is determined that a temperature condition for switching back is satisfied as a result of the detection in the step S1502, the modem 270 can switch the communication scheme to a second communication scheme (S1506). In this instance, the modem 270 can request the base station according to the currently connected second communication scheme to switch to the first communication scheme, exchanges data and messages required for switching the communication scheme with the base station, and perform connection to the base station according to the first communication scheme through at least one of the antenna modules according to the first communication scheme. Furthermore, when wireless communication according to the first communication scheme is performed by the step S1506, the modem 270 can perform the process of FIG. 12 again to perform thermal mitigation for each antenna module according to a temperature difference between the antenna modules.

In the above description, when the electronic device performs wireless communication according to the first communication scheme, the operation process of performing thermal mitigation according to a temperature difference of each antenna module with respect to a surface temperature of the electronic device 100 has been described in detail. Hereinafter, an example in which thermal mitigation is performed for each antenna module will be described with reference to the drawings. The following description assumes there are three antenna modules. In addition, the antenna module having the second highest temperature is assumed to be below a preset temperature from a first time point 1601 to a fourth time point 1604.

Figure 16:
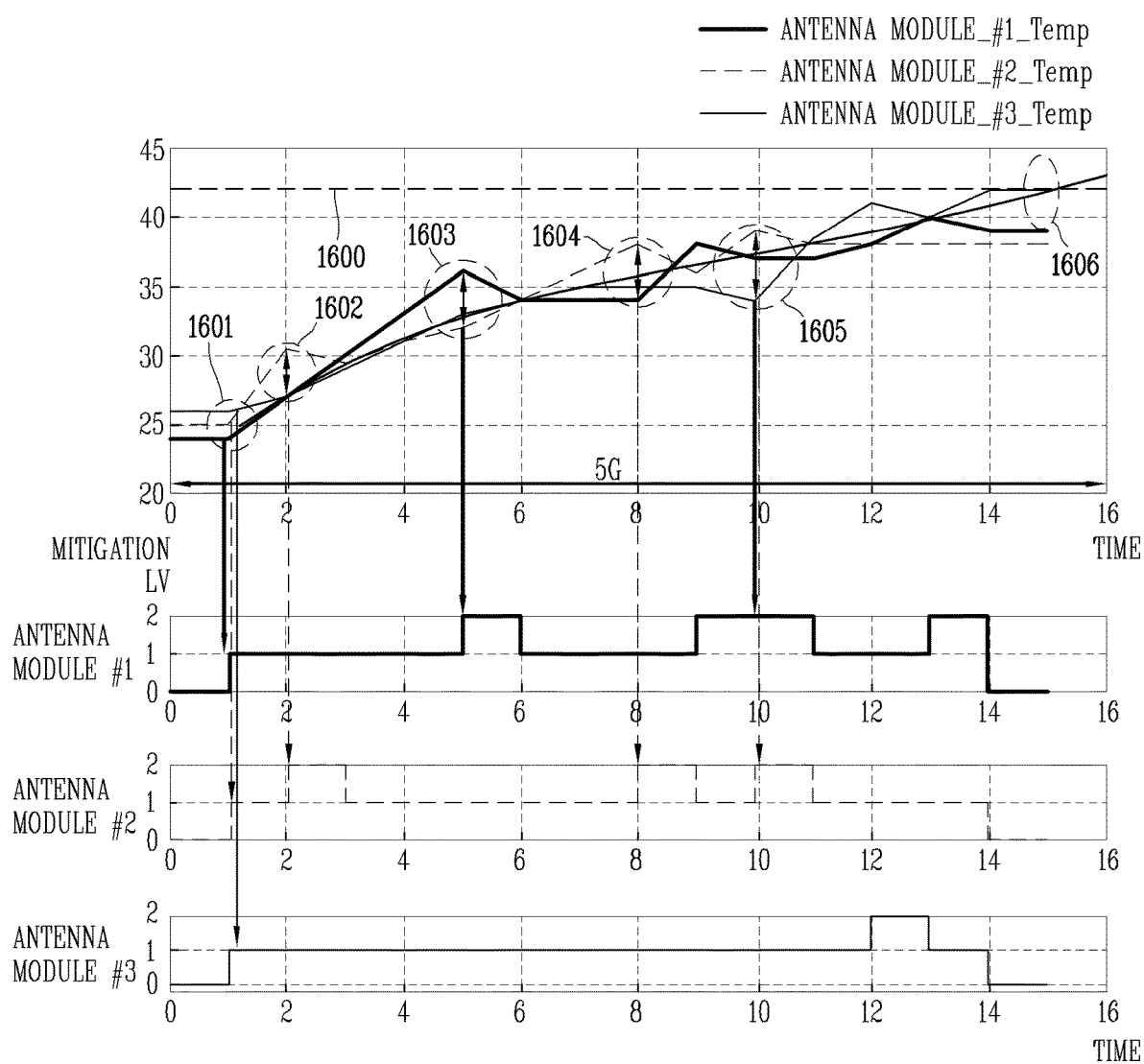
FIG. 16 is an exemplary view illustrating examples in which thermal mitigation is carried out according to an electric field state and a temperature difference between antenna modules in an electronic device associated with the present disclosure.

FIG. 16 illustrates an example in which thermal mitigation is performed for each antenna module in the electronic device 100 associated with the present disclosure when the electric field is excellent. Referring to FIG. 16, when the electric field is excellent, the modem 270 of the electronic device 100 can perform a first step of thermal mitigation regardless of temperature to suppress the heat generation of each antenna module, as described in step S1206 of FIG. 12. Accordingly, as shown at the first time point 1601, all of the first to third antenna modules can perform the first step of thermal mitigation (LV.1). In this instance, because the number of activated antennas is reduced, the heat generation of all of the first to third antenna modules can be suppressed.

When the electronic device 100 performs wireless communication with the base station using the second antenna module, the temperature of the second antenna module can increase significantly compared to other antenna modules. In this instance, when a temperature difference between the second antenna module having the increased temperature and the other antenna module having the lowest temperature is above a threshold temperature difference determined by the AP temperature at the second time point 1602, the modem 270 can perform a second step of thermal mitigation (LV.2) for the second antenna module. Accordingly, antenna module switching can be performed from the second antenna module to another antenna module other than the second antenna module. In addition, the second antenna module can be cooled according to deactivation, and as described in the process of FIG. 14, the thermal mitigation step can be changed according to the cooled temperature.

In addition, when switching to the first antenna module is performed at the second time point 1603, the modem 270 can perform wireless communication with the base station through the first antenna module. Therefore, the temperature of the first antenna module can increase significantly compared to other antenna modules. Furthermore, at the third time point 1603, when a temperature difference between the first antenna module and the other antenna module having the lowest temperature is above a threshold temperature difference determined by the AP temperature at the third time point 1603, the modem 270 can perform a second step of thermal mitigation (LV.2) for the first antenna module.

In addition, antenna module switching can be performed with other antenna modules other than the first antenna module. In this instance, as shown in FIG. 16, when the second antenna module is cooled and changed to the first step of thermal mitigation at the third time point 1603, the modem 270 can perform antenna module switching to either one of the second antenna module and the third antenna.

In this instance, when switched to the second antenna module, the temperature of the second antenna module can rise again. Furthermore, at the fourth time point 1604, when a temperature difference between the second antenna module and the other antenna module having the lowest temperature is above a threshold temperature difference determined by the AP temperature at the fourth time point 1604, the modem 270 can perform a second step of thermal mitigation (LV.2) again for the second antenna module. Accordingly, antenna module switching can be performed from the second antenna module to another antenna module (e.g., first antenna module) other than the second antenna module.

In addition, when antenna module switching to the first antenna module is performed at the fourth time point, the modem 270 can perform wireless communication with the base station through the first antenna module. In this state, when a temperature difference between the first antenna module and the other antenna module having the lowest temperature is above a threshold temperature difference determined by the AP temperature at the fifth time point 1605, the modem 270 can perform a second step of thermal mitigation (LV.2) again for the first antenna module.

However, as shown in FIG. 16, when communication according to the first communication scheme is performed, the AP temperature and the temperature of each antenna module can increase with time. Accordingly, unlike the first time point 1601 to the fourth time point 1604, the temperature of the antenna module having the second highest temperature can exceed a preset temperature. In addition, as shown at the fifth time point 1605 of FIG. 16, the temperature of the third antenna module can be significantly lower than that of other antenna modules as the first and second antenna modules are mainly used.

In this instance, a temperature between an antenna module having the second highest temperature and the third antenna module having the lowest temperature can be above a threshold temperature difference according to the AP temperature at the fifth time point 1605. Then, as described above with reference to FIG. 13, the modem 270 can perform the second step of thermal mitigation (LV.2) for both the antenna module having the highest temperature and the antenna module having the second highest temperature. Accordingly, the modem 270 can perform antenna module switching to the third antenna module having the lowest temperature, and perform wireless communication with the base station through the third antenna module.

As described above, according to the present disclosure, antenna module switching can be performed until a surface temperature of the electronic device 100, that is, the AP temperature or the temperature of the circuit board reaches a preset communication scheme switching temperature, or until all the temperatures of respective antenna modules reach the communication scheme switching temperature to perform wireless communication according to the first communication scheme. In other words, according to the present disclosure, the modem 270 can perform wireless communication according to the first communication scheme until the surface temperature of the electronic device 100 reaches a preset communication scheme switching temperature 1600.

Accordingly, the modem 270 can maintain a state of performing wireless communication according to the first communication scheme until the sixth time point 1606 at which the AP temperature reaches the preset communication scheme switching temperature 1600. Furthermore, when the AP temperature reaches the preset communication scheme switching temperature 1600 at the sixth time point 1606, the modem 270 can switch the communication scheme to the second communication scheme. In this instance, the second step of thermal mitigation (LV.2) can be performed on all of the first to third antenna modules, and cooling according to the second step of thermal mitigation can be performed.

In addition, when the electric field is not excellent, unlike the above-described FIG. 16, the modem 270 of the electronic device 100 associated with the present disclosure may not perform the first step of thermal mitigation for each antenna module in step S1206 of FIG. 12. In this instance, each antenna module can be driven while all the antennas are activated.

In addition, initially, as the duration of communication according to the first communication scheme is not long, the temperature of all the antenna modules can be lower than a preset first temperature for the first step of thermal mitigation. However, when communication according to the first communication scheme continues, the temperature of each antenna module can also rise in addition to the temperature rise of the AP 280. Accordingly, when there is an antenna module reaching the first temperature, the modem 270 can perform the first step of thermal mitigation for the relevant antenna module (step S1206 of FIG. 12).

However, when the electric field is not good, the temperature of the first antenna module performing wireless communication with the base station can rise faster than other antenna modules. In this instance, when the temperature of the first antenna module exceeds a preset third temperature, the modem 270 can perform the second step of thermal mitigation for the first antenna module (step S1210 of FIG. 12). Accordingly, the second stage heat dissipation can be performed on the first antenna module, and the first stage heat dissipation can be performed on the second to third antenna modules.

Furthermore, when the second step of thermal mitigation is performed on the first antenna module, the modem 270 can perform switching to either one of the second to third antenna modules, and perform wireless communication with the base station through the switched antenna module. In this instance, the first antenna module can be deactivated and cooled according to the second step of thermal mitigation, and can be switched to a state in which the first step of thermal mitigation is performed, according to the cooled temperature. In the case where there is no antenna module that reaches a specific temperature (third temperature) when a preset temperature detection period expires, antenna module switching can be performed by any one of the remaining antenna modules except for the antenna module having the highest temperature based on a temperature difference between the antenna modules and a threshold temperature difference determined according to a surface temperature of the electronic device 100. In this instance, when the antenna module having the second highest temperature satisfies a preset condition as described above with reference to FIG. 13, the modem 270 also performs the second step of thermal mitigation for the antenna module having second highest temperature, thereby performing switching to the antenna module having lowest temperature.

According to an embodiment of the present disclosure, when a temperature difference between the antenna modules is greater than the surface temperature, even when not heated up to a temperature corresponding to a second thermal mitigation condition, switching to the antenna module having a lower temperature can be performed. Accordingly, the present disclosure can increase the effect of thermal mitigation, and due to the increased thermal mitigation effect, thereby having an effect of further extending a period of time available for 5G communication connection.

In addition, the present disclosure can allow the first step of thermal mitigation to be performed based on an electric field state regardless of the temperature of the antenna module, thereby suppressing the heat generation of the antenna module as much as possible.

Further scope of applicability of the present disclosure will become apparent from the detailed description given hereinafter. However, it should be understood that the detailed description and specific examples such as preferred embodiments of the invention are given by way of illustration only, since various changes and modifications within the spirit and scope of the invention will become apparent to those skilled in the art from this detailed description.

With regard to the present disclosure described above, a design of an antenna including the processor 180 and a controller for controlling the same in the electronic device 100 having a plurality of antennas and a control method thereof may be implemented as codes readable by a computer on a medium written by a program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the processor 180 of the electronic device. The foregoing embodiments are merely exemplary and are not to be considered as limiting the present disclosure. The scope of the invention should be determined by reasonable interpretation of the appended claims and all changes that come within the equivalent scope of the invention are included in the scope of the invention.

What is claimed is:

1. An electronic device, comprising:
a plurality of antenna modules configured to wireless communicate with a base station according to a first communication scheme;
a plurality of temperature sensors respectively provided in the plurality of antenna modules and configured to detect a temperature of each antenna module; and
a modem configured to:
detect a temperature difference between a highest temperature antenna module and a lowest temperature antenna module among the plurality of antenna modules, and
switch from using a first antenna module performing wireless communication with the base station to a second antenna module among the plurality of antenna modules to perform the wireless communication with the base station based on the detected temperature difference being above a preset temperature difference.

2. The electronic device of claim 1, wherein the modem is further configured to:
detect an electric field state of a signal communicated between the electronic device and the base station according to the first communication scheme prior to detecting the temperature difference, and
deactivate at least one antenna module in the plurality of antenna modules when the electric field state is above a preset level as a result of the detected electric field state.

3. The electronic device of claim 2, wherein the modem is further configured to:
determine whether the electric field state of the signal according to the first communication scheme is above the preset level based on a reference signal received power (RSRP) or a bit error rate (BER) detected from the signal according to the first communication scheme.

4. The electronic device of claim 1, wherein the preset temperature difference varies depending on a surface temperature of the electronic device.

5. The electronic device of claim 4, wherein the preset temperature difference decreases as the surface temperature of the electronic device increases.

6. The electronic device of claim 4, further comprising:
an application processor (AP) configured to control the modem,
wherein the surface temperature of the electronic device is determined according to a temperature of the AP or a temperature of a circuit board disposed with the AP.

7. The electronic device of claim 1, wherein heat dissipation characteristics of the plurality of antenna modules varies depending on at least one of a placement position of each antenna module, characteristics of a heat dissipation member connected to each antenna module, a structure of each antenna module connected to the heat dissipation member, a material of another member adjacent to each antenna module, and a shape of an inner space in which each antenna module is disposed.

8. The electronic device of claim 1, wherein the second antenna module has a lowest temperature among the plurality of antenna modules.

9. The electronic device of claim 1, wherein the second antenna module includes any one of remaining antenna modules except for the highest temperature antenna module and at least one antenna module satisfying a preset condition determined according to a temperature difference between a preset temperature and the lowest temperature antenna module.

10. The electronic device of claim 9, wherein when switching to the second antenna module, the modem is further configured to deactivate together the highest temperature antenna module and the at least one antenna module satisfying the preset condition.

11. The electronic device of claim 1, further comprising:
an antenna module configured to transmit and receive a signal according to a second communication scheme different from the first communication scheme,
wherein the modem is further configured to:
determine a surface temperature of the electronic device, and
change the first communication scheme to the second communication scheme, perform the wireless communication through the antenna module according to the second communication scheme when all temperatures detected from the plurality of antenna modules or the determined surface temperature of the electronic device are above a preset communication scheme switching temperature.

12. The electronic device of claim 11, wherein the first communication scheme is a 5G communication scheme using a millimeter wave (mmWave) frequency band, and
wherein the second communication scheme is either one of a 5G communication scheme using a sub-6 frequency band and a 4G communication scheme.

13. The electronic device of claim 11, wherein when the first communication scheme is changed to the second communication scheme, the modem is further configured to change the second communication scheme back to the first communication scheme based on whether all temperatures detected from the plurality of antenna modules or the determined surface temperature of the electronic device are below a preset fs communication scheme allowable temperature.

14. The electronic device of claim 1, wherein the modem is further configured to:
- detect a temperature difference between the highest temperature antenna module and the lowest temperature antenna module according to a preset period, and
- perform antenna module switching according to a result of detecting the temperature difference.

15. The electronic device of claim 14, wherein when the preset period expires, the modem is further configured to:
- detect whether there is an antenna module that has been switched to an inactive state by the antenna module switching among the plurality of antenna modules, and
- change the preset period according to a result of detecting whether there is the antenna module that has been switched to the inactive state.

16. A method of controlling an electronic device, the method comprising:
- performing wireless communication according to a first communication scheme through any one of a plurality of antenna modules provided in the electronic device;
- detecting an antenna module exceeding a preset first temperature among the plurality of antenna modules;
- detecting a temperature difference between a highest temperature antenna module and a lowest temperature antenna module among the plurality of antenna modules when the antenna module exceeding the first temperature is not detected;
- determining a threshold temperature difference according to a surface temperature of the electronic device; and
- switching from using a first antenna module performing wireless communication with a base station to a second antenna module among the plurality of antenna modules to perform the wireless communication with the base station according to a result of comparing the temperature difference and the threshold temperature difference.

17. The method of claim 16, wherein the performing wireless communication according to the first communication scheme comprises:
- detecting an electric field state between the base station and the electronic device; and
- deactivating at least one antenna in the plurality of antenna modules based on the detected electric field state.

18. The method of claim 16, further comprising:
- detecting an antenna module exceeding a preset second temperature among the plurality of antenna modules except for the highest temperature antenna module;
- detecting a second temperature difference between the antenna module exceeding the second temperature and the lowest temperature antenna module;
- detecting whether the second temperature difference is above the threshold temperature difference; and
- switching the first antenna module to any one of remaining antenna modules except for the highest temperature antenna module and the antenna module exceeding the second temperature when the second temperature difference is above the threshold temperature difference.

19. The method of claim 16, wherein the second antenna module includes any one of remaining antenna modules except for the highest temperature antenna module and at least one antenna module satisfying a preset condition determined according to a temperature difference between a preset temperature and the lowest temperature antenna module.

20. The method of claim 19, wherein when switching to the second antenna module, the method further comprises deactivating together the highest temperature antenna module and the at least one antenna module that satisfies the preset condition.

* * * * *